US 6,655,114 B2

(12) United States Patent
Hiramoto et al.

(10) Patent No.: US 6,655,114 B2
(45) Date of Patent: Dec. 2, 2003

(54) APPARATUS AND METHOD FOR SEALING AND INSPECTING A SEAL PORTION OF A PACKAGING BAG

(75) Inventors: Shinichi Hiramoto, Iwakuni (JP); Yasuhiro Masuoka, Iwakuni (JP); Keizou Hirata, Iwakuni (JP); Takehiro Fujitomi, Iwakuni (JP)

(73) Assignee: Toyo Jidoki Co., LTD, Tokyo (JP)

( * ) Notice: Subject to any disclaimer, the term of this patent is extended or adjusted under 35 U.S.C. 154(b) by 0 days.

(21) Appl. No.: 09/783,768

(22) Filed: Feb. 15, 2001

(65) Prior Publication Data

US 2001/0015056 A1 Aug. 23, 2001

(30) Foreign Application Priority Data

Feb. 23, 2000 (JP) ........................................ 2000-045432
Jan. 16, 2001 (JP) ........................................ 2001-007784

(51) Int. Cl.$^7$ .............................................. B65B 51/10
(52) U.S. Cl. .............................................. 53/479; 53/53
(58) Field of Search .......................... 53/156, 547, 548, 53/53, 479

(56) References Cited

U.S. PATENT DOCUMENTS

| | | | | |
|---|---|---|---|---|
| 5,184,190 A | * | 2/1993 | Rai et al. ................ | 356/239.1 |
| 5,226,316 A | * | 7/1993 | Mally et al. ............. | 73/49.3 |
| 5,372,042 A | * | 12/1994 | Jarman et al. ........... | 73/588 |
| 5,515,159 A | * | 5/1996 | Sites et al. .............. | 356/237.1 |
| 5,533,385 A | * | 7/1996 | Frievalt .................. | 73/49.3 |
| 5,732,529 A | * | 3/1998 | Dey et al. ............... | 53/389.2 |
| 6,097,427 A | * | 8/2000 | Dey et al. ............... | 348/92 |
| 6,105,419 A | * | 8/2000 | Michels et al. ......... | 73/49.3 |
| 6,373,001 B1 | * | 4/2002 | Kono et al. ............. | 177/25.18 |
| 6,396,578 B2 | * | 5/2002 | Her ........................ | 356/237.5 |

* cited by examiner

Primary Examiner—Rinaldi I. Rada
Assistant Examiner—Gloria R Weeks
(74) Attorney, Agent, or Firm—Galgano & Burke

(57) ABSTRACT

A method of sealing an opening portion of a packaging container by utilizing fusion bonding of the base material, together with an apparatus and method for inspecting the sealed portion. The container material has a welding layer as the innermost layer. The welding layer is melted at a seal portion defined along the edge of the opening portion of the container. A part of the melt from the welding layer is allowed to flow out from the edge of the opening portion, thereby sealing the seal portion and also forming an efflux layer outside the opening portion by the melt flowing out and solidified. An image of at least a part of the sealed portion and its vicinities is taken. At least a part of the image is defined as an inspection region. The image of the inspection region is subjected to predetermined image processing to calculate data concerning the efflux layer formed outside the sealed portion. The calculated data is compared with a preset condition for judgment to judge the sealing quality of the sealed portion.

11 Claims, 25 Drawing Sheets

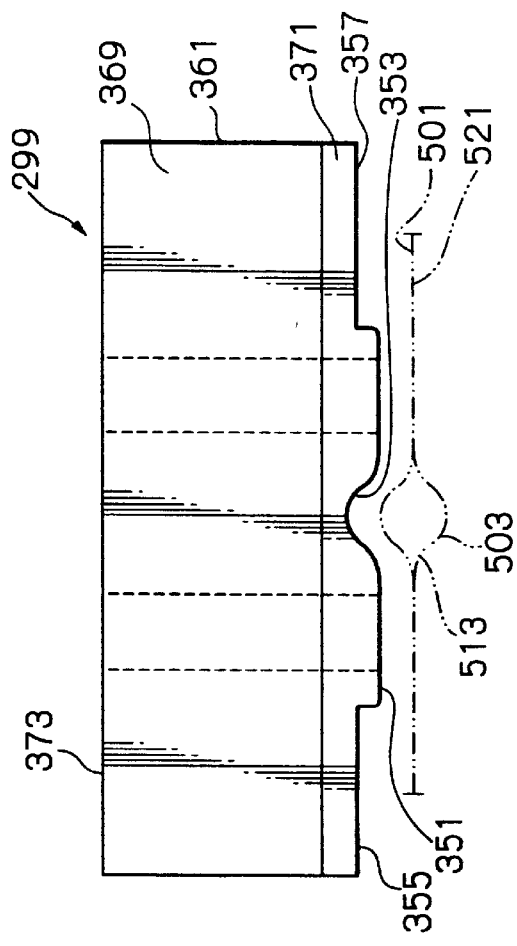
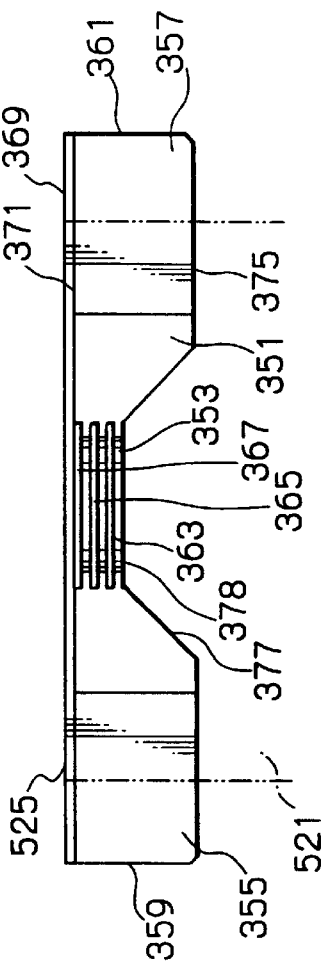
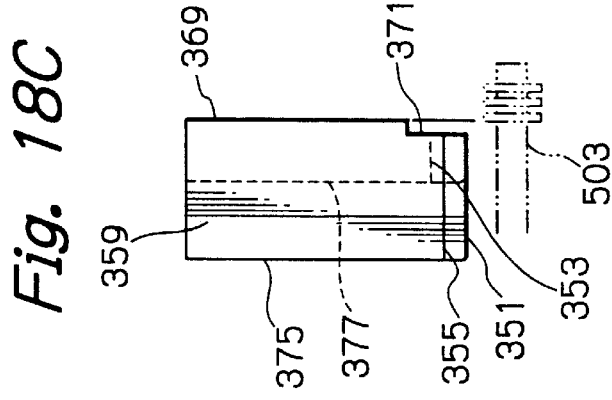

APPARATUS AND METHOD FOR SEALING AND INSPECTING A SEAL PORTION OF A PACKAGING BAG

BACKGROUND OF THE INVENTION

1. Field of the Invention

The present invention relates to a sealing method in which when a seal portion of a packaging container is sealed, a specific part serving as an inspective object is formed so that it can be used for inspection of the sealed portion, and also relates to heat-treating plates for use in the sealing method. Further, the present invention relates to an inspection apparatus and method for inspecting the inspective object. In addition, the present invention relates to an automatic filling and packaging system having such an inspection apparatus.

2. Discussion of Related Art

As packaging containers for foods and the like, bags are widely used which are made of a packaging material formed from a stack of a plurality of thin synthetic resin films in which the innermost layer is made of a thermoweldable resin material, e.g. polyethylene. The operation of filling a food or other material into such a bag is automated. That is, the mouth portion of the bag is opened, and the material to be packed is filled into the bag. After necessary treatment, e.g. deaeration, has been performed, the bag mouth portion is pressed between a pair of hot plates or the like to weld together the mutually opposing innermost layers, thereby sealing the mouth portion of the bag. Recently, use has been made of spouted packaging containers that are convenient for storing a beverage, e.g. a sports drink or juice, in a portable fashion. Sealing between the spout and the container body is effected mostly by welding.

Incidentally, there has heretofore been provided no method of accurately judging the sealing quality of the sealed portion of such a packaging container, which has been sealed by thermal welding. In general, the inspection for the sealing quality is performed by visual observation, which lacks reliability. With the conventional sealing method, a specific part capable of representatively indicating the sealing condition of the sealed portion is not formed. To perform an inspection for the sealing quality, the whole sealed portion needs to be inspected. Accordingly, a great deal of time is required for the inspection, and it is likely that defectives may be overlooked.

SUMMARY OF THE INVENTION

The present invention was made in view of the above-described problems associated with the prior art. Accordingly, an object of the present invention is to make it possible to accurately inspect a sealed portion of a packaging container formed of a resin packaging material, which is sealed by utilizing fusion bonding of the packaging material. More specifically, an object of the present invention is to provide a sealing method wherein when a seal portion of a packaging container is sealed, an inspective object capable of representatively indicating the sealing condition of the sealed portion is formed, and also provide heat-treating plates for use in the sealing method. Another object of the present invention is to provide an inspection method and apparatus particularly suitable for inspecting an inspective object formed as stated above.

To attain the above-described objects, the present invention provides a sealing method in which a welding layer constituting the innermost layer of the base material of a packaging container is melted at a seal portion defined along the edge of an opening portion to be sealed of the packaging container. A part of the melt from the welding layer is allowed to flow out from the edge of the opening portion at a predetermined position along the edge and solidified to form an efflux layer serving as an inspective object.

In addition, the present invention provides a pair of heat-treating plates suitable for use in the above-described sealing method. The heat-treating plates press an opening portion of a packaging container from both sides to seal the opening portion and, at the same time, to form the above-described efflux layer as an inspective object. The heat-treating plates have respective welding portion-pressing portions facing each other to press a welding portion of the packaging container defined at a predetermined distance from the edge of the opening portion. The heat-treating plates further have respective extension-pressing portions facing each other to press an extension defined at a predetermined position along the edge of the opening portion to extend with a predetermined width from the welding portion to the edge. Preferably, the heat-treating plates are provided as cooling plates for cooling the welding portion melted by hot plates.

The inspection of the sealed portion according to the present invention is performed as follows. An image of an imaging subject including at least a part of the sealed portion and its vicinities is taken. At least a part of the taken image is defined as an inspection region. The image of the inspection region is subjected to predetermined image processing to calculate data concerning an efflux layer formed outside the sealed portion by the melted material flowing out of the sealed portion. The calculated data is compared with a preset condition for judgment to judge the sealing quality of the sealed portion.

To perform the above-described inspection, an apparatus for inspecting the sealed portion according to the present invention includes an imaging device, and a controller including a central control unit, a defective area setting unit, and a sealing quality judging unit. The imaging device takes an image of at least a part of the sealed portion and its vicinities. The central control unit controls the sealed portion inspection apparatus. Further, the central control unit captures the image taken with the imaging device, defines an inspection region including at least a part of the taken image in accordance with the inspection conditions, divides the inspection region into a plurality of pixels of a predetermined size, and judges whether or not each pixel located outside the sealed portion is filled with the efflux layer formed by the melted material flowing out of the sealed portion. The defective area setting unit sets inspection conditions and a criterion for judgment of the sealing quality. The sealing quality judging unit compares the result of the judgment made by the central control unit with the criterion for judgment to judge the sealing quality.

Preferably, the position of the inspection region is controlled in accordance with the position of the imaging subject within the field of view of the imaging device.

Other objects and advantages of the present invention will become apparent from the following detailed description of illustrated embodiments of the invention.

BRIEF DESCRIPTION OF THE DRAWINGS

FIGS. 2A, 2B and 2C are views showing a spout to be fitted to a packaging container, of which: FIG. 2A is a front view; FIG. 2B is a side view; and FIG. 2C is a bottom view.

FIGS. 18A, 18B and 18C are views showing a hot plate for primary sealing in the fourth embodiment, of which: FIG. 18A is a plan view; FIG. 18B is a front view; and FIG. 18C is a left-hand side view.

FIGS. 20A, 20B and 20C are views showing a hot plate for secondary sealing in the fourth embodiment, of which: FIG. 20A is a plan view; FIG. 20B is a front view; and FIG. 20C is a left-hand side view.

FIGS. 21A, 21B and 21C are views showing a cooling plate used in the fourth embodiment, of which: FIG. 21A is a plan view; FIG. 21B is a front view; and FIG. 21C is a left-hand side view.

DETAILED DESCRIPTION OF THE PREFERRED EMBODIMENTS

Specific embodiments of the present invention will be described below with reference to the accompanying drawings. It should be noted, however, that the scope of the present invention is not limited to the embodiments stated below.

Figure 1:
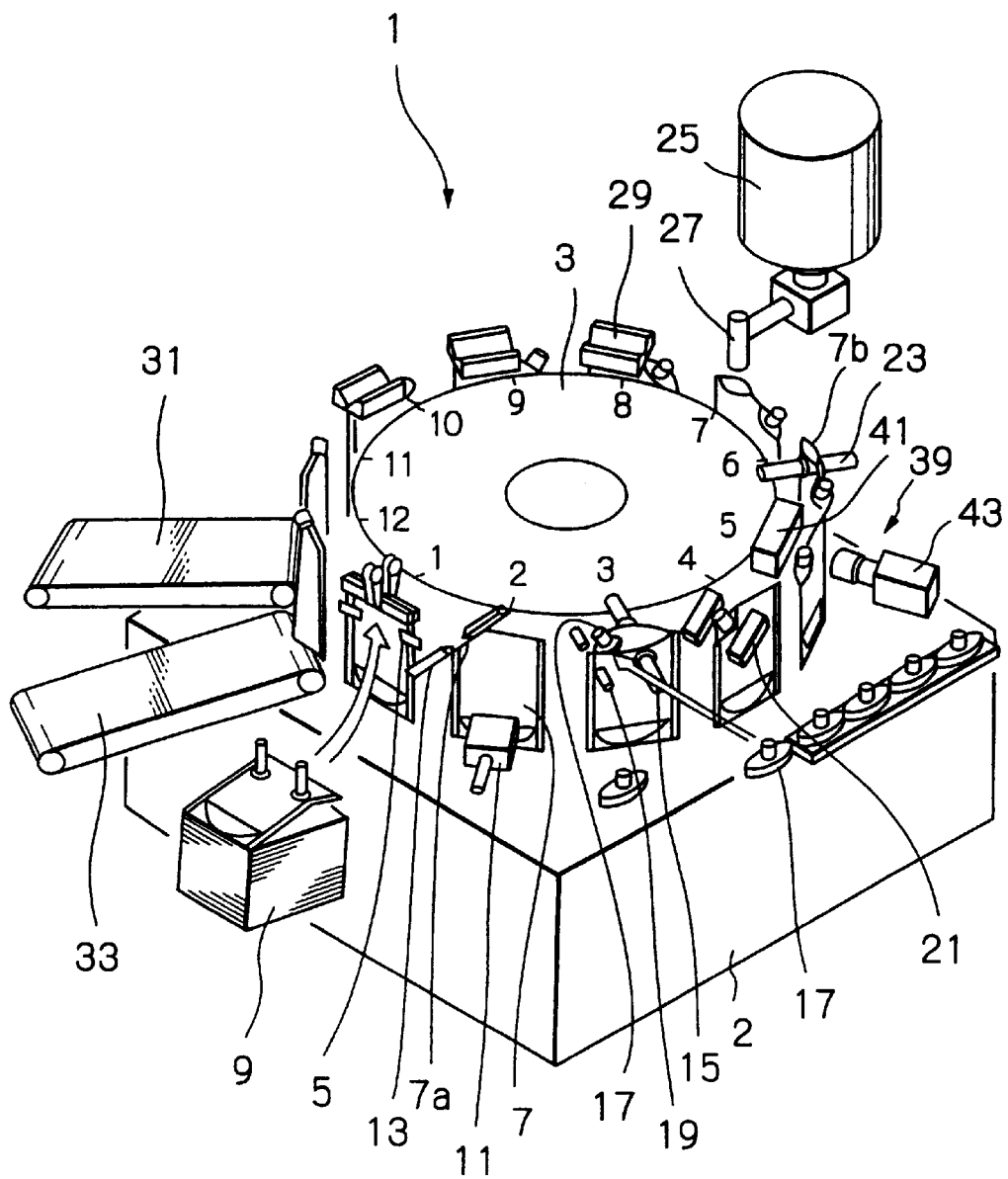
FIG. 1 is a diagram showing the arrangement of an automatic food filling and packaging system using a sealed portion inspection apparatus according to a first embodiment of the present invention.

FIG. 1 is a diagram showing the arrangement of an automatic food and/or filling and packaging system 1 using the inspection apparatus according to the present invention. In the filling and packaging system 1, a spout is fitted to a packaging container, and a liquid material is filled into the spouted packaging container and packaged therein. The system 1 has a rotary table 3 equipped with grippers 5. A bag 7 is gripped with grippers 5 and thus moved through various steps successively.

At step 1, bags 7 stored in a bag magazine 9 are taken out one by one. Each bag 7 is open at the upper side thereof and sealed at the other three sides. Each bag 7 taken out of the magazine 9 is delivered to the table 3 and gripped with grippers 5. The bag 7 is moved to step 2 by rotation of the table 3, where the bag 7 is printed with a date by a printer 11. In addition, one corner of the upper side of the bag 7 is cut off diagonally with a cutter 13 to form a spout fitting portion 7a. At step 3, the top of the bag 7 is opened up with an appropriate opening device 15, e.g. a suction cup. One of spouts 17 transferred successively by another transfer device is inserted into the portion of the bag 7 cut at step 2, and the portion of the bag 7 fitted with the spout 17 is temporarily sealed or welded with a hot bar sealer 19. Then, at step 4, the interface between the spout fitting portion 7a and the spout 17 and also the remaining portion of the spout fitting portion 7a are sealed with a welder 21. The subsequent step 5 is an inspection step for inspecting the sealed portion of the bag 7, including the spout welding portion. This will be described later in detail.

Step 6 is a bag mouth opening step at which the unsealed portion of the upper side of the bag 7, that is, a filling opening 7b, is opened up with an opening device 23. Step 7 is a filling step at which a liquid material to be packed is supplied from a tank 25 through a nozzle 27 and filled into the bag 7 through the filling opening 7b. Steps 8 and 9 are first and second sealing steps at which the filling opening 7b of the bag 7 is sealed with a sealer 29 equipped with hot plates. Step 10 is a cooling step at which the sealed portion heated at steps 8 and 9 is cooled. At step 11, the bag 7 is discharged onto a non-defective bag conveyor 31. It should be noted that a bag 7 judged to be defective at step 5 passes through the subsequent steps without undergoing operations such as filling of a material to be packed and sealing of the filling opening 7b. The defective bag 7 is discharged onto a defective bag conveyor 33 at step 12.

Figure 2A:
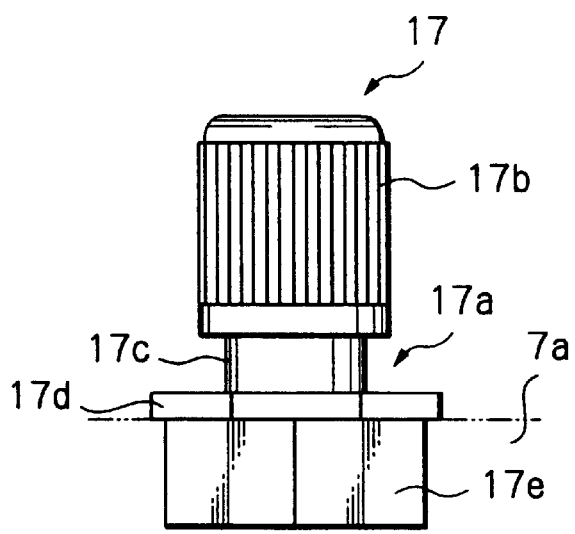
Figure 2B:
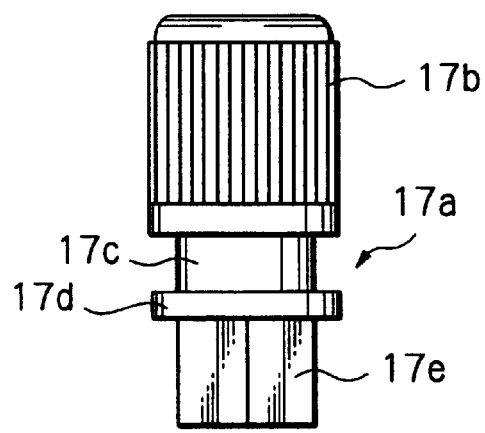
Figure 2C:
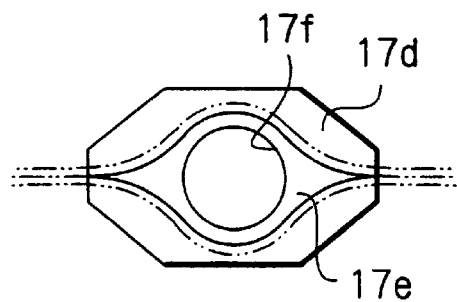

The following is a description of the inspection method carried out with an inspection apparatus 39 at step 5. Prior to the description of the inspection method, the spout 17 used in this embodiment will be described with reference to FIG. 2. In FIGS. 2A, 2B and 2C are a front view, a right-hand side view and a bottom view, respectively, of a spout 17.

In this embodiment, the spout 17 is fitted to a spout fitting portion 7a (see FIG. 3) formed by diagonally cutting an upper edge portion of the bag 7, and filling of a material to be packed is carried out through a filling opening 7b (see FIG. 3) formed by the remaining portion of the upper side of the bag 7. The spout 17 is fitted to the spout fitting portion 7a in a state where a spout body 17a is fitted with a cap 17b. The spout body 17a has a cylindrical mouth portion 17c at the top. The spout body 17a further has a flange 17d and an insertion portion 17e. A hole 17f extends through the mouth portion 17c, the flange 17d and the insertion portion 17e. In other words, the insertion portion 17e of the spout 17 is inserted into the bag 7 from the spout fitting portion 7a of the bag 7 until the end edge of the spout fitting portion 7a abuts on the lower surface of the flange 17d. In this state, the spout 17 is fitted to the spout fitting portion 7a. In FIGS. 2A and 2C, a part of the spout fitting portion 7a of the bag 7 is shown by the chain double-dashed lines.

Figure 3:
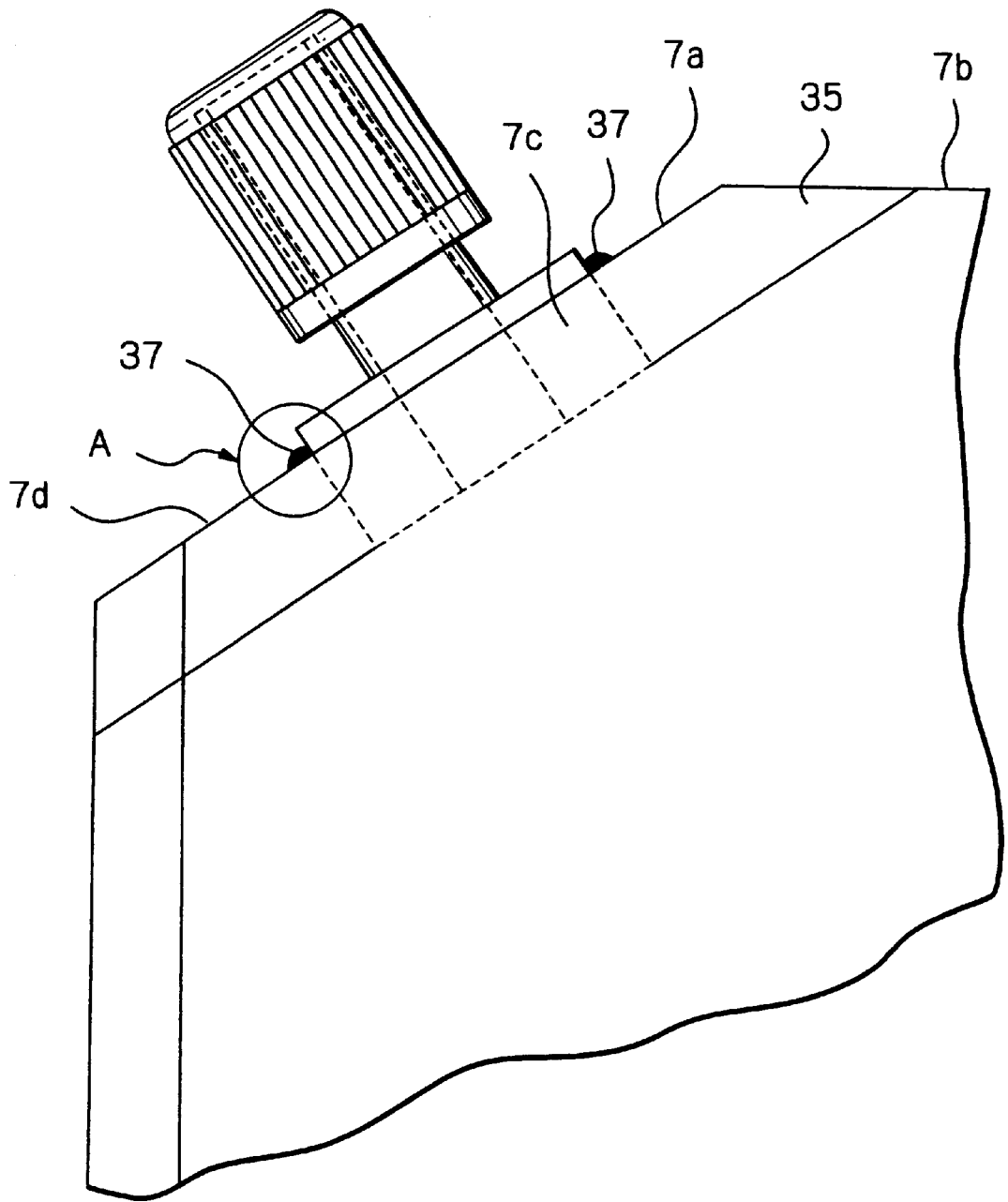
FIG. 3 is an enlarged view showing a welded part of a spouted packaging container.

In this state, the bag 7 is moved to step 4 at which welding is carried out to secure the spout 17 to the spout fitting portion 7a of the bag 7 and to seal the spout fitting portion 7a, thereby forming a spout-fitting sealed portion 35 as shown in FIG. 3. More specifically, at this step 4, the spout 17 and a spout welding portion 7c of the spout fitting portion 7a are pressed against each other from both sides with the welder 21. In this state, heat is applied to effect welding, thereby securing the spout 17 to the spout fitting portion 7a in a sealed state. In addition, the upper and lower sheets of the bag 7 are welded together at the remaining portion 7d of the spout fitting portion 7a to seal the remaining portion 7d. This sealing operation causes a part of the materials of the spout 17 and the bag 7 to melt and flow out of the bag 7 to form an efflux layer 37 in the vicinity of each end of the flange 17d of the spout body 17a, as shown in FIG. 3 by being painted over with black. The reason for this is as follows. As shown in FIG. 2C, both ends of the insertion portion 17e of the spout body 17a are thin in wall thickness. Therefore, the material of the spout 17 readily melts and flows out at the thin-walled ends of the insertion portion 17e, together with the inner layer material of the bag 7. In this embodiment, the efflux layer 37 is used as a representative of the whole spout-fitting sealed portion 35. That is, the efflux layer 37 is inspected to judge whether the sealing quality of the spout-fitting sealed portion 35 is good or not.

Figure 5:
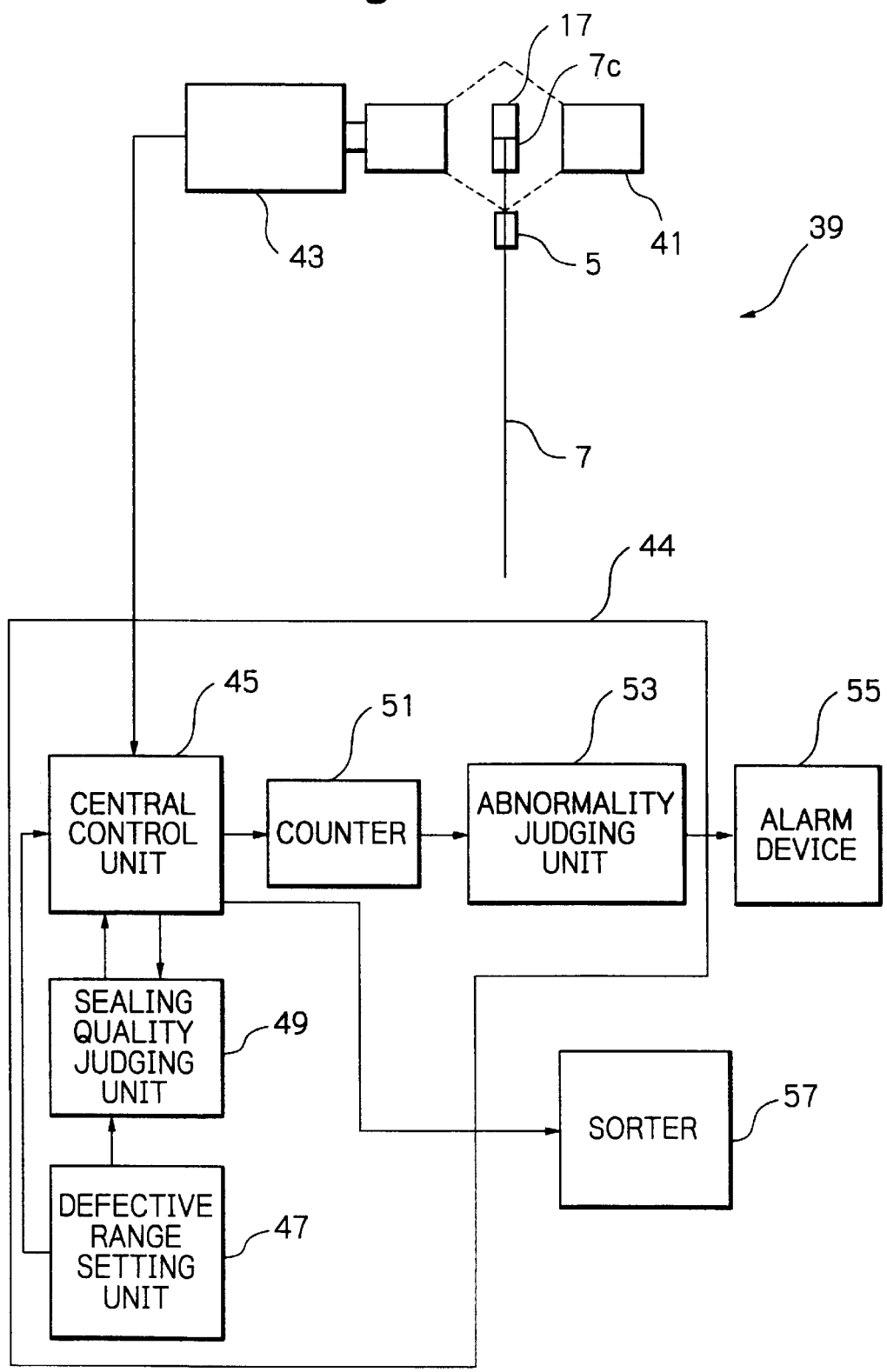
FIG. 5 is a block diagram showing the arrangement of the inspection apparatus shown in FIG. 1.

Referring to FIG. 1 again, step 5 is provided with an inspection apparatus 39, the arrangement of which is schematically shown in the block diagram of FIG. 5. The inspection apparatus 39 has a light source 41, which is a flash in this embodiment, and an imaging device 43, which is a CCD camera in this embodiment. At step 5, the light source 41 and the imaging device 43 are secured to a base 2 of the filling and packaging system 1 at an appropriate spacing so as to face each other across the spout fitting portion 7a of the bag 7. That is, the imaging device 43 takes an image of the spout-fitting sealed portion 35 formed at the sealing step.

A controller 44 has a central control unit 45, a defective range setting unit 47, a sealing quality judging unit 49, a counter 51, and an abnormality judging unit 53. The central control unit 45 captures the image of the spout-fitting sealed portion 35 taken with the imaging device 43, defines a predetermined portion of the image as an inspection region, enlarges the image of the inspection region and divides the enlarged image into pixels 48 of a size predetermined by the defective range setting unit 47. Then, the central control unit 45 judges whether or not each pixel 48 located outside the edge of the spout fitting portion 7a of the bag 7 is filled with an efflux layer formed by the melted material flowing out of the spout fitting portion 7a. The sealing quality judging unit 49 compares the result of measurement outputted from the central control unit 45 with a criterion for judgment of the sealing quality set by the defective range setting unit 47.

The counter 51 counts the number of signals each outputted from the central control unit 45 every time the sealing quality of the bag 7 is judged to be good or not. The abnormality judging unit 53 compares the result of counting by the counter 51 with a preset condition to judge abnormality of the welder 21. If the welder 21 is judged to be under abnormal conditions, the abnormality judging unit 53 activates an alarm device 55, for example, to sound a buzzer or to display the occurrence of abnormality on a display unit. Further, the filling and packaging system 1 may be suspended at that time. The central control unit 45 also delivers a signal to a sorter 57 for sorting defective and non-defective bags from each other. If the bag 7 under inspection is judged to be non-defective, the sorter 57 discharges the bag 7 onto the non-defective bag conveyor 31 by controlling a gripper opening-closing device (not shown). If the bag 7 under inspection is judged to be defective, the sorter 57 discharges the bag 7 onto the defective bag conveyor 33.

Figure 6:
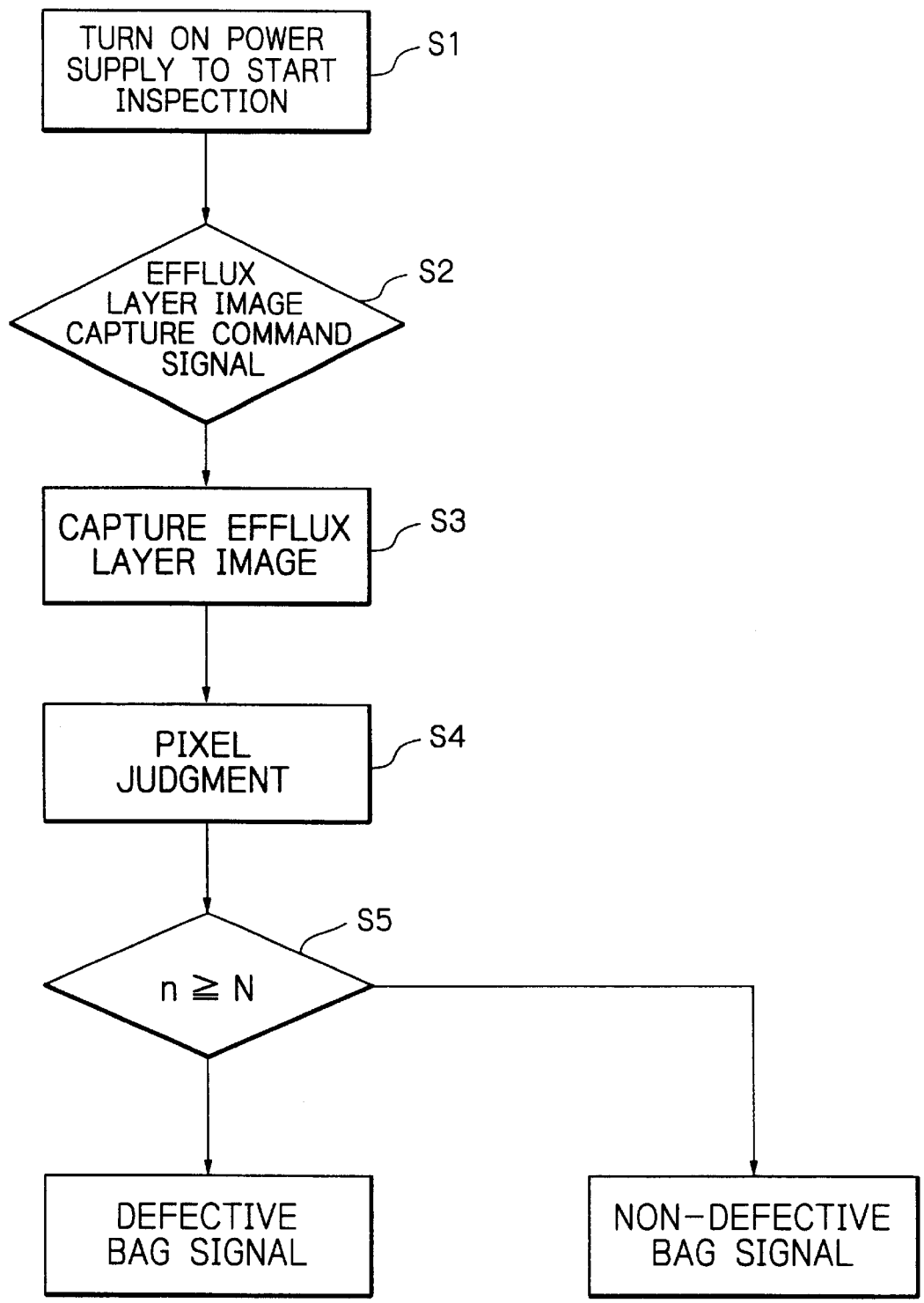
FIG. 6 is a flowchart showing the procedure of inspection of the sealed portion.

FIG. 6 is a flowchart of an inspection process performed by the inspection apparatus 39 in this embodiment. The inspection procedure in this embodiment will be described below with reference to FIGS. 4 and 6. First, at step S1, the power supply is turned on to start inspection. At step S2, the central control unit 45 delivers a command signal to capture an efflux layer image. At step S3, an image of the efflux layer is captured. That is, an image of the spout-fitting sealed portion 35 is taken with the imaging device 43. In this case, it is not always necessary to take an image of the whole sealed portion 35; it is only necessary that the image taken with the imaging device 43 include the efflux layers 37 formed at both sides of the spout 17.

The image thus taken is sent to the central control unit 45 where an inspection region is taken out from the image. The image of the inspection region is enlarged at a predetermined magnification, and the enlarged image is divided into pixels 48 of a predetermined size. Further, it is judged whether or not each pixel 48 located outside the end edge of the spout fitting portion 7a is filled with an efflux layer formed by the melted material of the spout 17 and/or the melted material of the bag 7. That is, pixel judgment is performed. In this case, a criterion for judgment is preset, and if 70 percent of the entire area of a pixel 48 is filled with the efflux layer, the pixel 48 is judged to be "filled". Then, the number n of "filled" pixels is calculated.

In this embodiment, a reference value N of "filled" pixels is preset by the defective range setting unit 47 as a criterion for judgment of the sealing quality. At step S5, the sealing quality judging unit 49 makes a comparison between the number n of "filled" pixels and the reference value N. If n is equal to or greater than N, a non-defective bag signal is outputted, whereas if n is smaller than N, a defective bag signal is outputted. In another embodiment, not only a lower-limit reference value but also an upper-limit reference value may be set, whereby when n is between the upper-limit value and the lower-limit value, the bag 7 under inspection is judged to be non-defective. The sorter 57 for sorting defective and non-deflective bags from each other operates on the basis of a signal from the sealing quality judging unit 49 to control the gripper opening-closing unit, as stated above. The abnormality judging unit 53 may be arranged to judge that there is an abnormality when a predetermined number of defective bags have been produced in succession, for example. Alternatively, the abnormality judging unit 53 may be arranged to judge that there is an abnormality when there is more than a predetermined number of defective bags among the latest 10 bags. The condition for judgment can be set at will.

Figure 4:
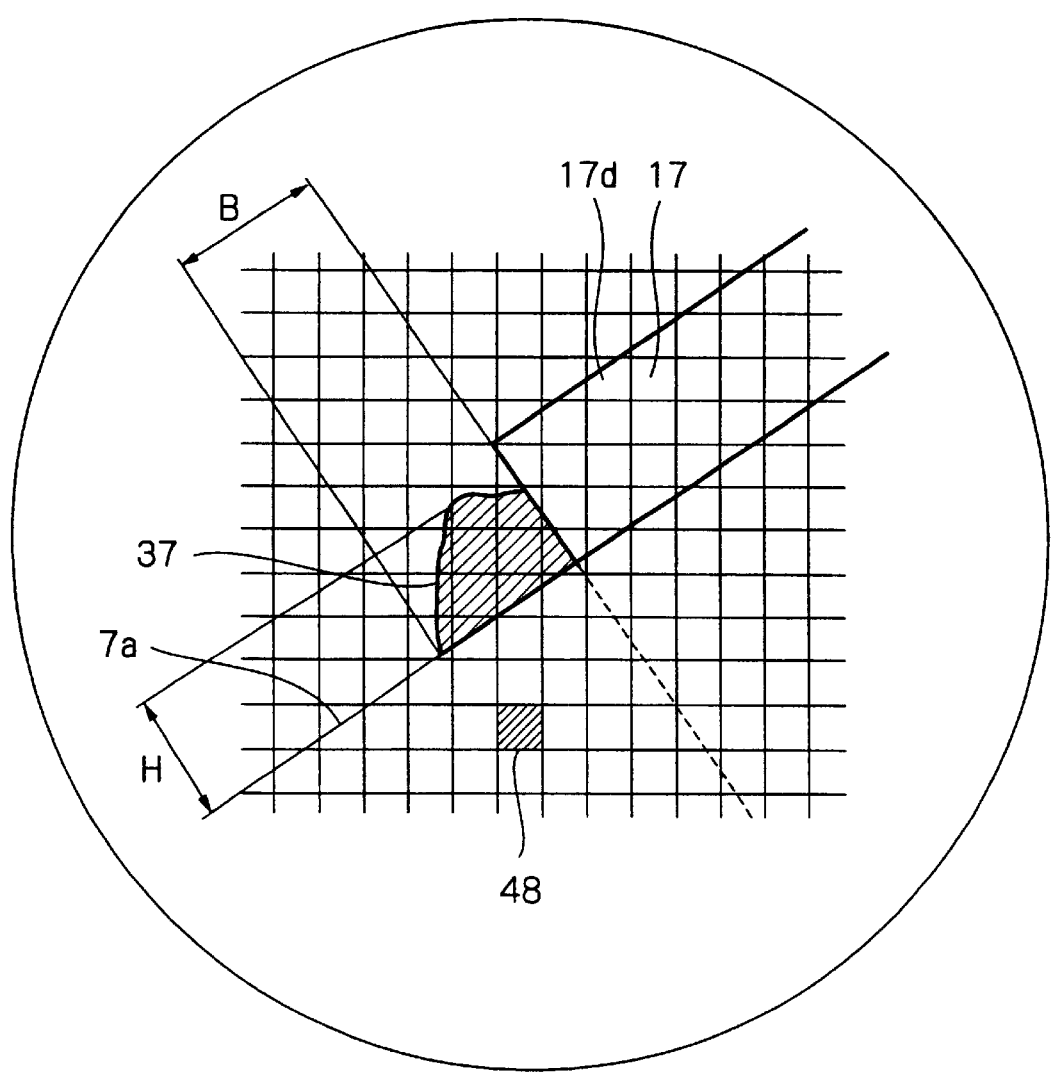
FIG. 4 is a diagram showing an image of an efflux layer and its vicinities as enlarged and divided into pixels.

In still another embodiment, the condition for judgment may be such that the maximum height H of the efflux layer 37 is measured as shown in FIG. 4, and when the maximum height H is within a predetermined range of numerical values, the bag 7 under inspection is judged to be nondefective. More specifically, a reference value for height (each of maximum and minimum values or only a minimum value) is preset by the defective range setting unit 47 in addition to the above-described reference value N for "filled" pixels, and the measured value H is compared with the reference value. Furthermore, a reference value for the width of the efflux layer 37 may be set to make a comparison with the measured value of the width B as shown in FIG. 4. The magnification at which the captured image is enlarged does not always need to be fixed but may be changed according to need. Similarly, the size of each pixel and the number of pixels may be varied according to need, and the reference value N for judgment may be changed in accordance with the variations in the size and number of pixels. These inspection conditions are set by the defective range setting unit 47. It should be noted that in the embodiment shown in FIG. 1 another inspection step may be added after step 10 to judge the sealing quality of the filling opening 7b of the bag 7.

Figure 7:
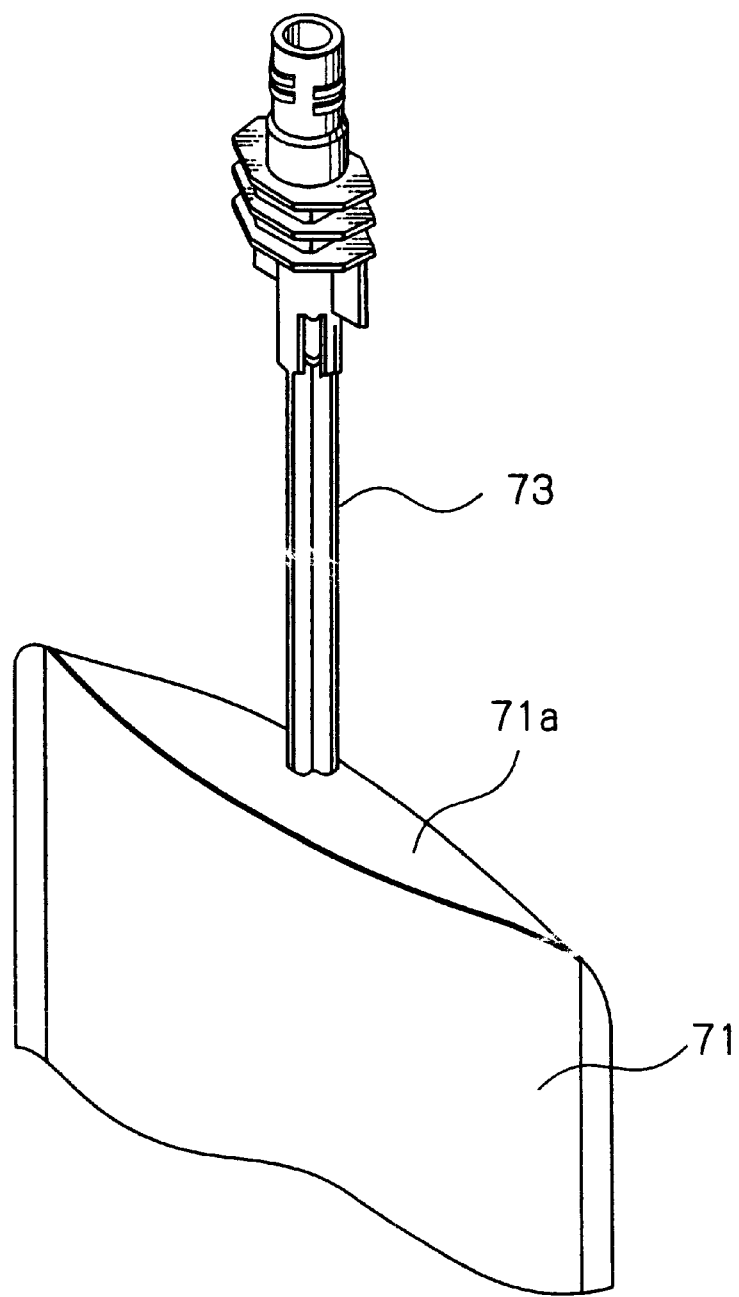
FIG. 7 is a fragmentary perspective view showing a spout and a container body used in a second embodiment of the present invention.
Figure 8:
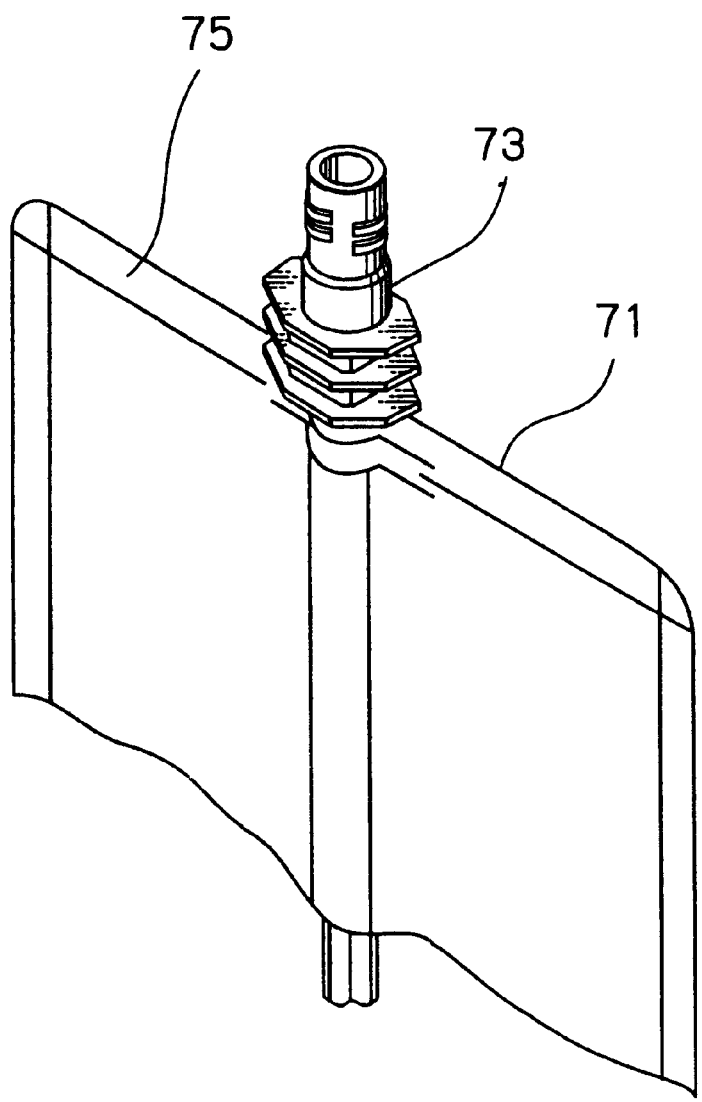
FIG. 8 is a fragmentary perspective view showing the way in which the spout is fitted to the container body in the second embodiment.

FIGS. 7 and 8 show a second embodiment of the present invention concerning a spouted packaging container as in the case of the first embodiment. However, unlike the first embodiment, the second embodiment is concerned with a packaging container of the type in which a spout 73 is fitted to an approximately central portion of the upper side of a bag 71 and a liquid material to be packed is filled into the bag 71 through the spout 73. Operations such as fitting of the spout 73 to the bag 71, welding, and filling of a material to be packed are mostly the same as those in the first embodiment except that the operation of diagonally cutting the top of the bag 71 with the cutter 13 as carried out at step 2 in the first embodiment is not performed in the second embodiment, and that the position of the bag 71 to which the spout 73 is fitted at step 3 is different from that in the first embodiment. Further, the steps of the process carried out in the second embodiment are publicly known except the inspection step. Therefore, a description of the known process steps is omitted.

Figure 9:
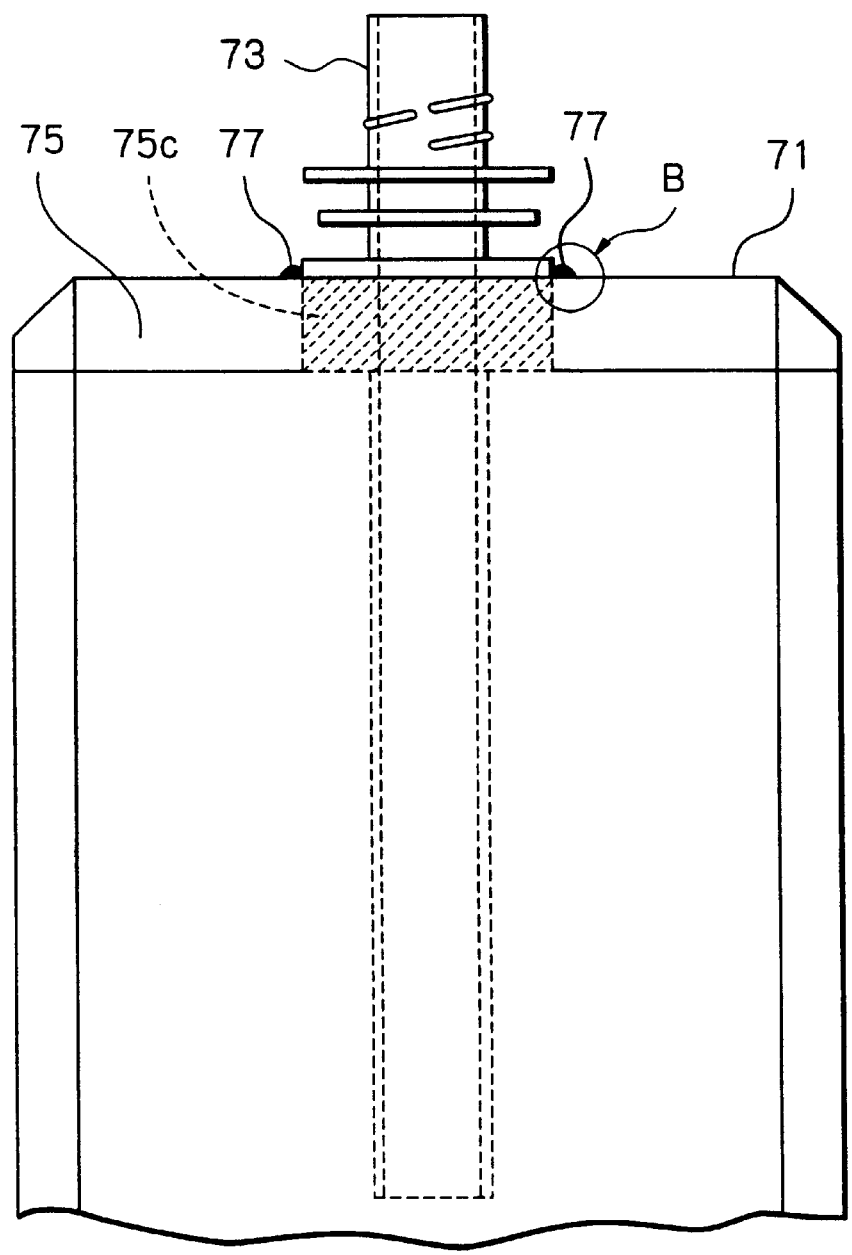
FIG. 9 is a fragmentary front view showing the way in which the spout is welded to the container body in the second embodiment.
Figure 10:
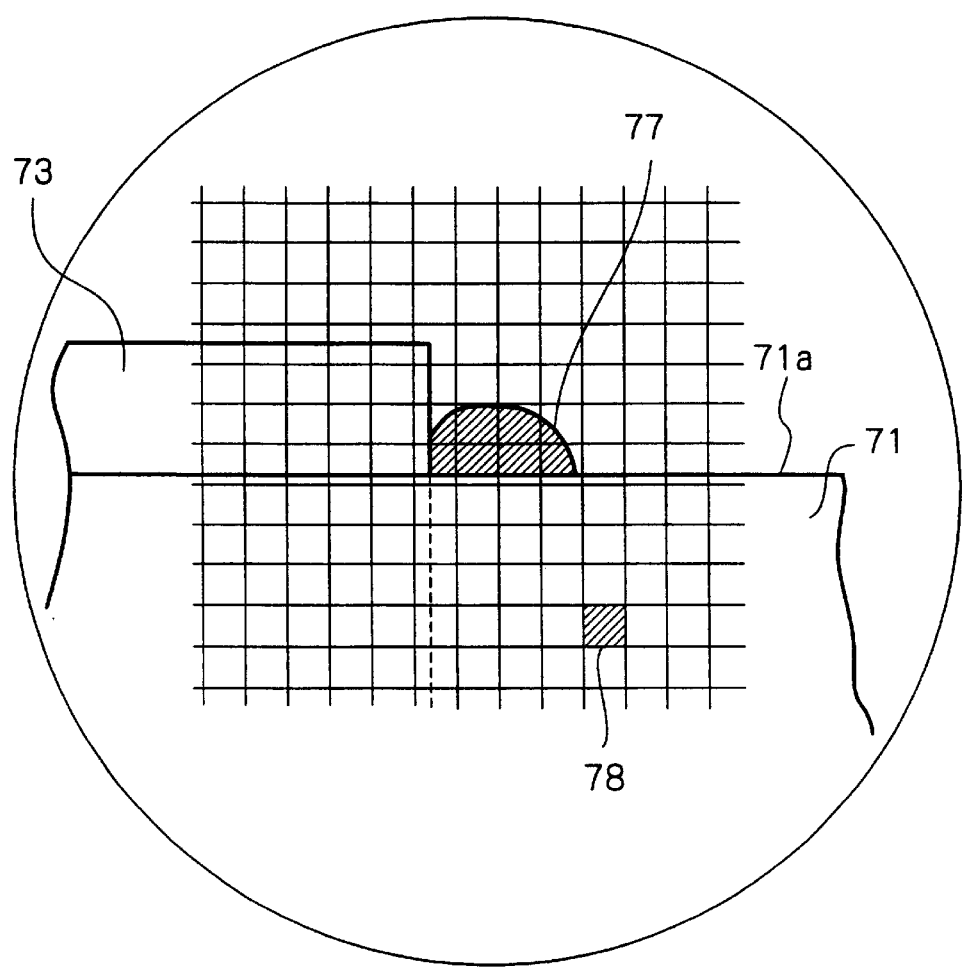
FIG. 10 is a diagram showing an image of an efflux layer and its vicinities as enlarged and divided into pixels in the second embodiment.

In the second embodiment also, at the same time as an opening portion 71a at the top of the bag 71 is sealed by welding, the spout 73 is fitted to the bag 71 by welding, thus forming a sealed portion 75. Consequently, as shown in FIG. 9, efflux layers 77 are formed in the vicinities of both ends of a spout welding portion 75c to which the spout 73 is welded. In this state, an image of the sealed portion 75 is taken with an imaging device 43 of an inspection apparatus 39 (the same reference numeral as in the first embodiment is used because it may be the same as the inspection apparatus used in the first embodiment). The image taken with the imaging device 43 is captured into a central control unit 45 to execute the same processing as in the first embodiment. FIG. 10 is a diagram showing an enlarged image of a portion containing a right-hand side efflux layer 77 in FIG. 9, that is, a portion within a circle indicated by the arrow B, which is defined as an inspection region and divided into pixels 78. Processing executed after the inspection step may be the same as in the first embodiment. Therefore, a description thereof is omitted.

Figure 11:
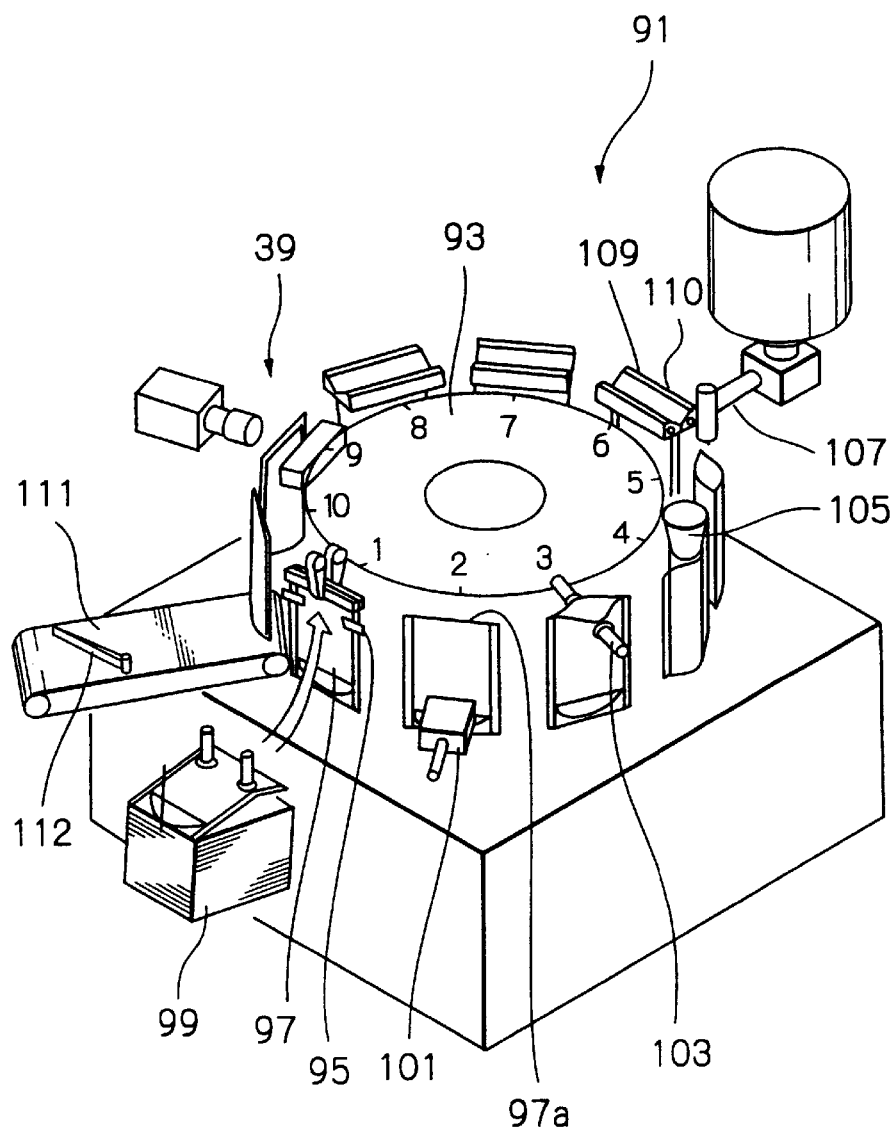
FIG. 11 is a diagram showing the arrangement of an automatic food filling and packaging system using a sealed portion inspection apparatus according to a third embodiment of the present invention.

The present invention is applicable not only to the inspection of the sealed portions of spouted packaging containers but also to the inspection of the sealed portions of spoutless bags for packaging known as "plain bags". FIG. 11 is a diagram showing the whole arrangement of an automatic filling and packaging system using plain bags to which the present invention is applied. In the figure, the filling and packaging system 91 is designed to pack a material in a plain bag-shaped packaging container 97. The system 91 also has a rotary table 93 equipped with grippers 95. A bag 97 is gripped with grippers 95 and thus moved through various steps successively.

At step 1, bags 97 are taken out from a bag magazine 99 one by one. Each bag 97 is delivered to the table 93 and gripped with grippers 95. When moved to step 2, the bag 97 is printed with a date by a printer 101. At step 3, a mouth portion 97a of the bag 97 is opened up with an opening device 103. At step 4, a solid material is loaded into the bag 97 by a solid material loading device 105. At step 5, a liquid material is filled into the bag 97 by a liquid material filling device 107. Steps 6 and 7 are sealing steps at which the opening portion 97a at the top of the bag 97 is sealed with a sealer 110 equipped with hot plates 109. Step 8 is a cooling step. Step 9 is an inspection step, which will be described later in detail. At step 10, the bag 97 is discharged onto a conveyor 111. In this embodiment, non-defective bags and defective bags are sorted from each other by activating a distributing arm 112 on the basis of the result of inspection performed at the inspection step.

An inspection apparatus used at the inspection step 9 may be the inspection apparatus 39 used in the first embodiment. In other words, the inspection apparatus 39 used in this embodiment also has the arrangement shown in FIG. 5 and performs an inspection operation according to the flowchart shown in FIG. 6.

Figure 12:
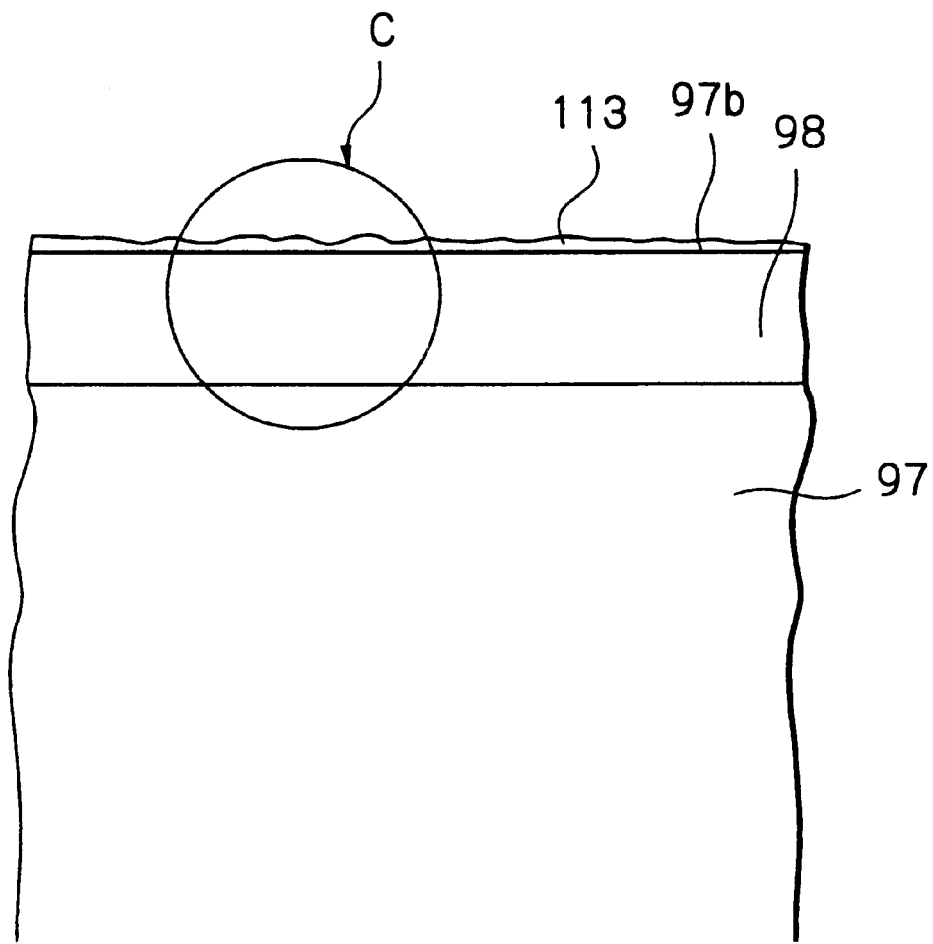
FIG. 12 is a fragmentary front view showing a container after its mouth portion has been welded in the third embodiment.
Figure 13:
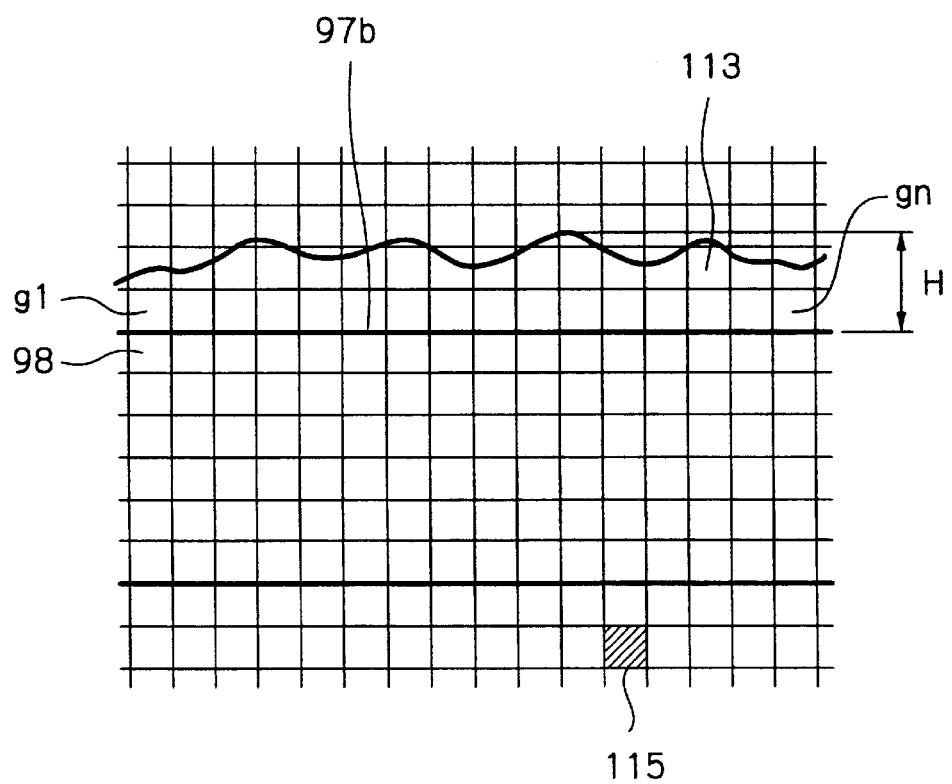
FIG. 13 is a diagram showing an image of an efflux layer and its vicinities as enlarged and divided into pixels in the third embodiment.

FIG. 12 is a fragmentary front view showing only a part of the bag 97 packed and sealed by the system 91 shown in FIG. 11. Reference numeral 113 denotes an efflux layer formed by the melt of the material of the bag 97 flowing out to the outside of the upper end edge 97b of the bag mouth portion 97a when the mouth portion 97a is sealed to form a sealed portion 98. FIG. 13 is a diagram showing an enlarged image of a portion of the sealed portion 98 indicated by the arrow C in FIG. 12. That is, an image of the sealed portion 98 is taken with the imaging device 43 of the inspection apparatus 39 and captured into the central control unit 45. The portion C of the image is taken out as an inspection region, enlarged and divided into pixels 115. The inspecting operation is carried out according to the flowchart shown in FIG. 6, as stated above. The number of pixels 115 filled with the efflux layer 113 in this portion is calculated to judge the sealing quality according to whether or not the number of pixels 115 filled with the efflux layer 113 satisfies a predetermined condition. In this case, the maximum height H of the efflux layer 113 from the upper end edge 97b of the bag 97 may be calculated to use it as one of criteria for judgment, as has been stated in connection with the first embodiment. Further, whether or not all the pixels g1 to gn in the first row defined immediately above the upper end edge 97b are filled with the efflux layer 113 may be used as one of criteria for judgment. Such a judgment may be made with respect to the entire width of the sealed portion 98 of the bag 97. Alternatively, a certain portion of the sealed portion 98 may be used as a representative of the whole to perform the inspection.

Figure 14:
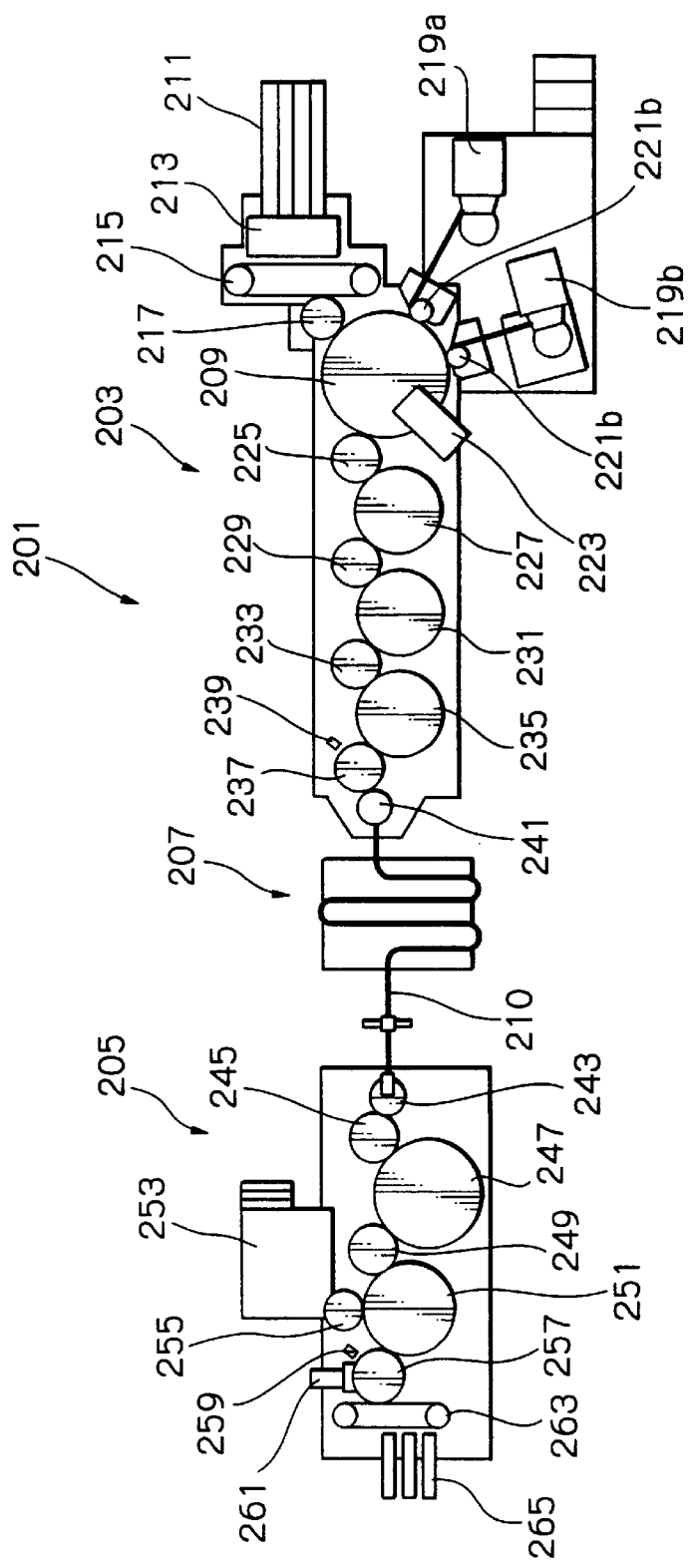
FIG. 14 is a diagram showing the arrangement of an automatic food filling and packaging system using an inspection apparatus according to a fourth embodiment of the present invention.

FIG. 14 is a diagram showing the arrangement of an automatic food and/or drink filling and packaging system 201 using an inspection apparatus according to a fourth embodiment of the present invention. The system 201 is designed to achieve a high-speed operation in comparison to the foregoing embodiments. For this purpose, the system 201 has a spout fitting apparatus 203 for fitting a spout to a bag and sealing the mouth of the bag and a filling apparatus 205 for filling a liquid material into the spouted bag. The spout fitting apparatus 203 and the filling apparatus 205 are connected through a buffer 207 serving as a bag storage. Rotors used in each of the apparatuses are arranged to rotate continuously. In this embodiment, a spout is fitted to an approximately central portion in the width direction of the opening portion at the upper side of a bag as in the case of the above-described second embodiment. The spout has three flanges spaced vertically (see FIGS. 19 and 22). In the following description, detailed illustration and description of techniques that have heretofore been known are omitted, and only techniques that relate to the present invention will be described in detail.

The spout fitting apparatus 203 has a rotor 209 for executing a spout tacking step at which a spout is inserted into the opening portion of a bag and a tacking operation is carried out. More specifically, the rotor 209 is supplied with bags and spouts. Bags are taken out from a conveyor-type magazine 211 (consisting of four rows in this embodiment) and delivered to a servo-loop 215 by a bag unloader 213. From the servo-loop 215, the bags are delivered to the rotor 209 by a delivery rotor 217. The bags are held by bag holders installed on the rotor 209 at equal spaces in the circumferential direction. In this state, the bags move as the rotor 209 rotates. Meanwhile, spouts are delivered to the rotor 209 from two spout feeders 219a and 219b through spout feed rotors 221a and 221b. The mouth of each bag is opened by a publicly known suction cup device, and a spout is inserted into the mouth of the bag. Then, the spout is tacked to the bag or the bag is temporarily sealed or welded by a temporary sealer 223, which may be similar to the hot bar sealer 19 stated in connection with the first embodiment.

The bag with the spout tacked thereto is delivered to a first intermediate rotor 225. The rotor 225 has a plurality of spout holding members installed thereon at equal spaces in the circumferential direction to support spouts, or bags, through the flanges formed on the spouts. As the spout holding members, known bifurcated members may be used. The bag is delivered from the first intermediate rotor 225 to a primary sealing rotor 227 for executing a primary sealing step. The rotor 227 is also provided with a plurality of spout holding members equally spaced in the circumferential direction. The spout holding members are different from those on the first intermediate rotor 225 in the position in the heightwise direction. That is, each spout is formed with three flanges as stated above, and the delivery of the bag from the first intermediate rotor 225 to the primary sealing rotor 227 is effected by supporting different flanges with the respective spout holding members on the two rotors 225 and 227. The delivery of the bag between rotors stated below is also effected in the same way as the above.

Then, the bag is delivered from the primary sealing rotor 227 through a second intermediate rotor 229 to a secondary sealing rotor 231 for executing a secondary sealing step. The bag is further delivered through a third intermediate rotor 223 to a sealed portion cooling rotor 235 for executing a sealed portion cooling step. Primary sealing, secondary sealing and sealed portion cooling, which are carried out during the intervening time, will be described later in detail.

From the sealed portion cooling rotor 235, the bag is delivered to a fourth intermediate rotor 237 for executing an inspection step (described later). An inspection apparatus 239 similar to that stated in the first embodiment is provided at a predetermined position along the circumference of the fourth intermediate rotor 237. The inspection apparatus 239 has a light source, e.g. an LED illuminating device, and an imaging device, e.g. a CCD camera. A bag judged to be defective by the inspection apparatus 239 is discharged from the line at a predetermined position during movement by the fourth intermediate rotor 237. A bag delivery rotor 241 receives a spouted bag from the fourth intermediate rotor 237 and delivers it to the buffer 207.

The bag moves along a travel line 210 in the buffer 207 and is delivered to a bag receiving rotor 243 provided at an inlet of the filling apparatus 205. Then, the bag is delivered to a first relay rotor 245 in the filling apparatus 205. A printer (not shown) is installed at a predetermined position along the circumference of the first relay rotor 245 to print the date of manufacture, etc. on a predetermined position of the bag. The printed bag is delivered to a filling rotor 247 for executing a step of filling a material into the bag. While being moved in the circumferential direction of the filling rotor 247 by the rotation of the filling rotor 247, the bag is filled with a liquid material to be packed through the spout.

The bag packed with the material is delivered through a second relay rotor 249 to a cap fitting rotor 251 for executing a step of fitting a cap to the spout. The cap fitting rotor 251 is supplied with a predetermined cap from a cap feeder 253 through a cap feed rotor 255 to fit the cap to the spout. Then, the bag is delivered to a delivery rotor 257. An inspection apparatus 259 is installed at a predetermined position along the circumference of the rotor 257 to inspect the bag for the cap fitting condition. The inspection apparatus 259 has an imaging device, e.g. a CCD camera. A bag judged to be defective in the cap fitting condition is discharged onto a defective bag discharge conveyor 261. A non-defective bag is carried by the rotor 257 as it is and delivered to a servo-loop 263. Then, the non-defective bag is discharged onto a product discharge conveyor 265.

Figure 15:
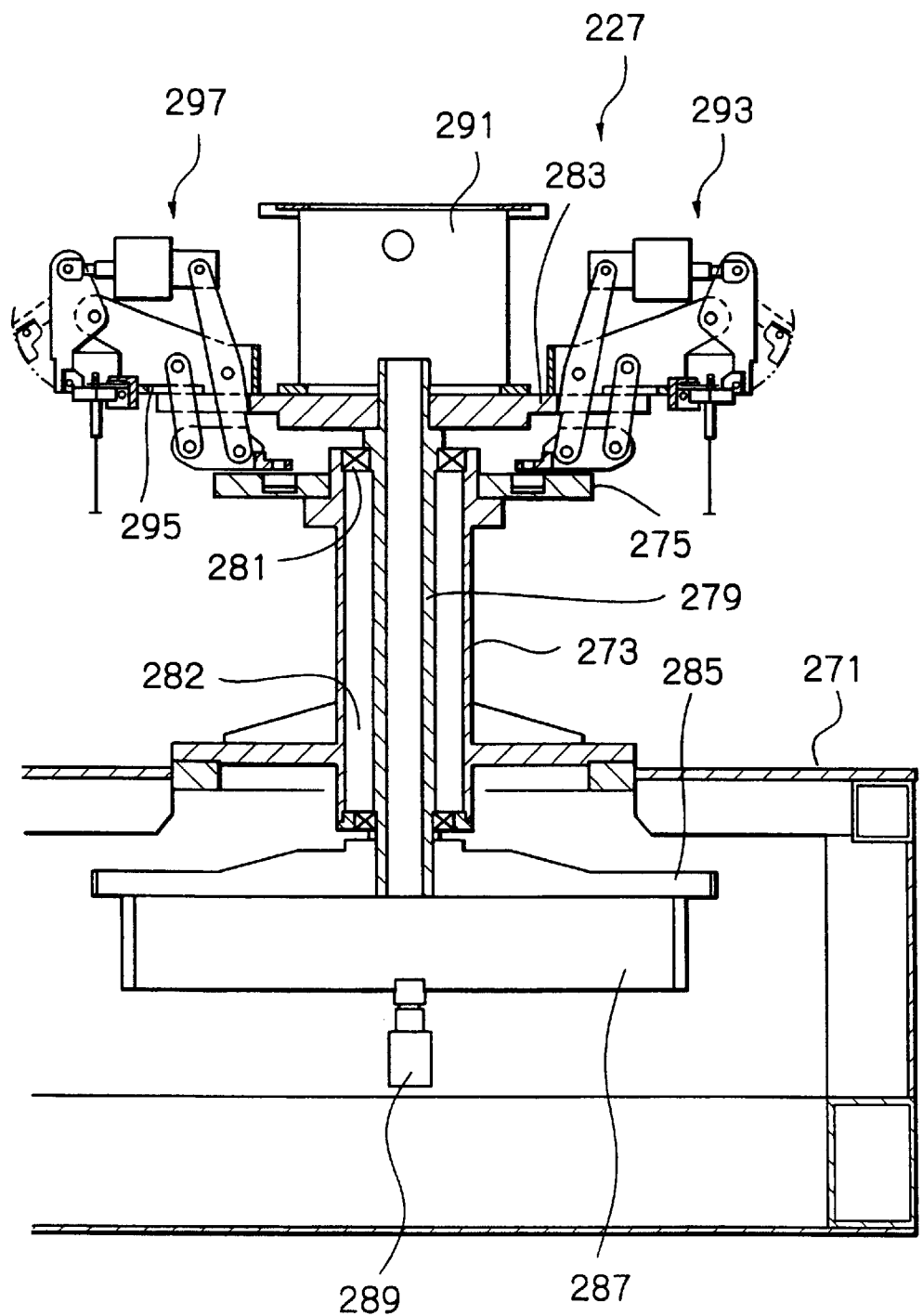
FIG. 15 is a sectional side view showing the whole arrangement of a primary sealing rotor in the fourth embodiment.
Figure 16:
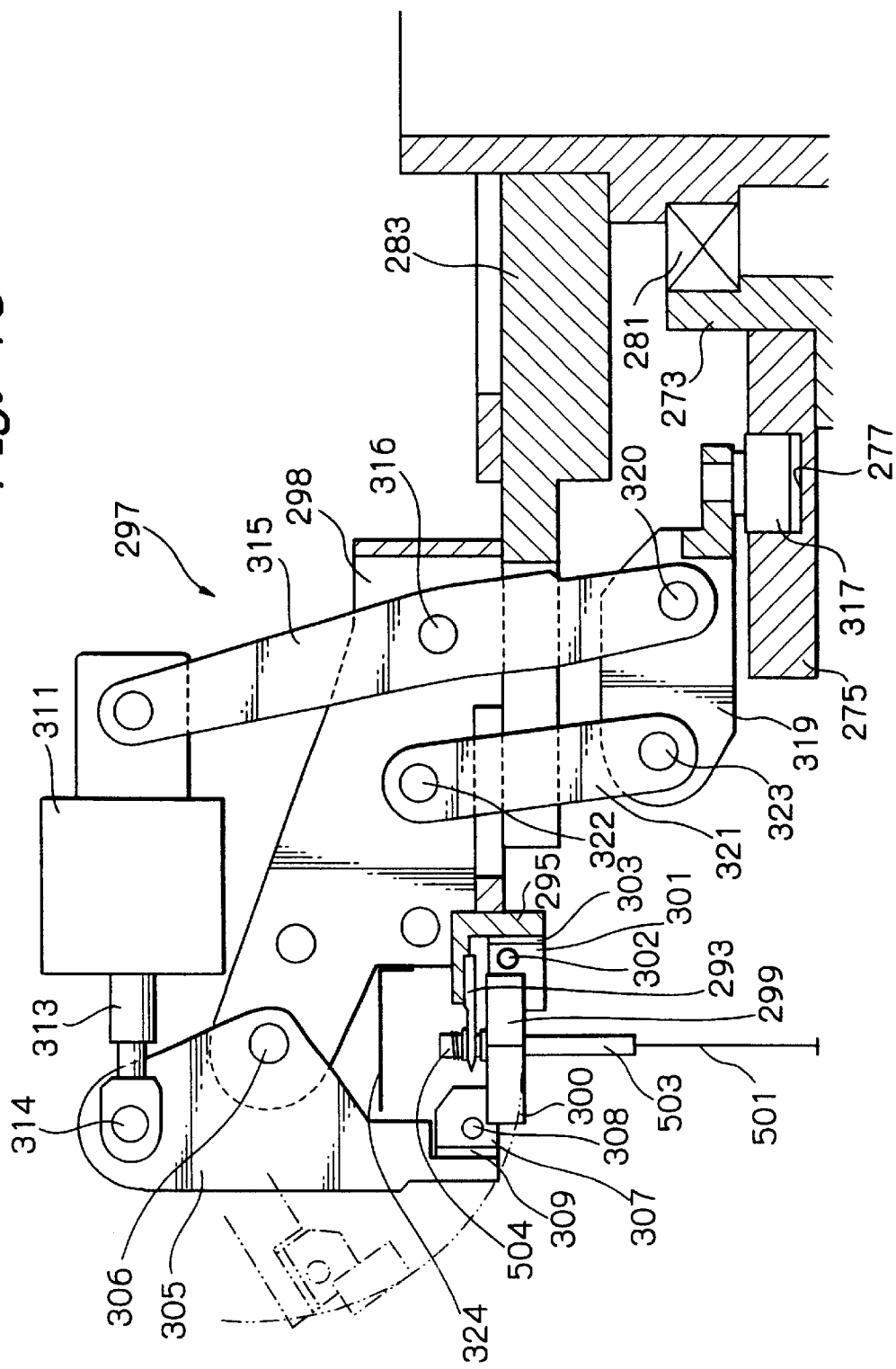
FIG. 16 is an enlarged sectional side view of a part of the primary sealing rotor shown in FIG. 15.
Figure 17:
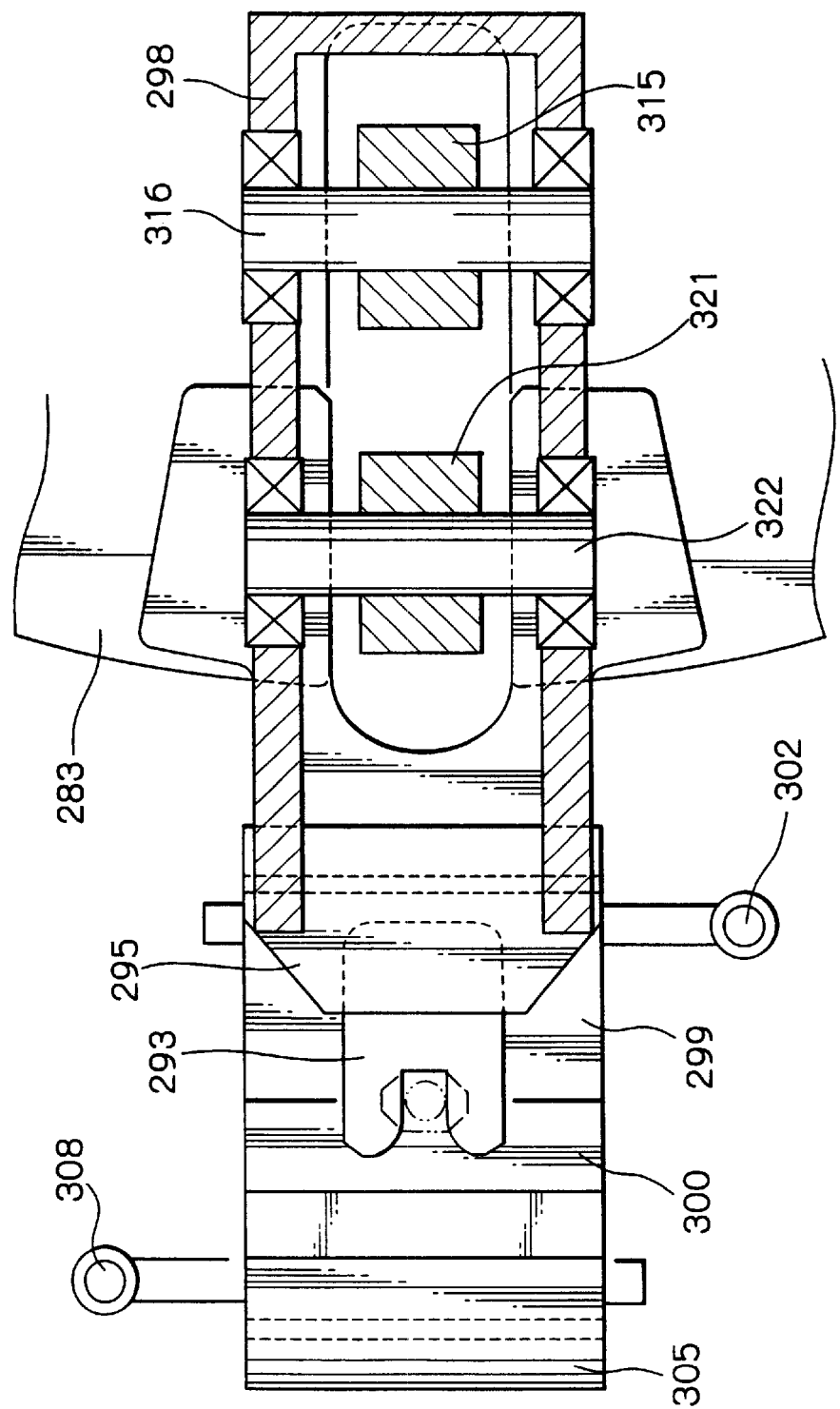
FIG. 17 is an enlarged sectional plan view of a part of the primary sealing rotor shown in FIG. 15.

Next, the primary sealing rotor 227 in this embodiment will be described with reference to FIGS. 15 to 17. FIG. 15 is a side view of the whole primary sealing rotor 227. FIG. 16 is an enlarged sectional side view of an essential part of the rotor 227. FIG. 17 is an enlarged sectional plan view of the rotor 227. The rotor 227 has a base 271 and a hollow stand 273 stood on the base 271. A plate cam 275 is secured to an upper end portion of the stand 273. The plate cam 275 has a cam groove 277 formed on the upper side thereof. The cam groove 277 is formed over 360 degrees in the circumferential direction. The cam groove 277 includes a portion forming a circular arc of the same radius from the center of the plate cam 275 as it moves in the circumferential direction. The cam groove 277 further includes a portion that comes toward the center of the plate cam 275 gradually as it moves in the circumferential direction. In addition, the cam groove 277 includes a portion that comes away from the center of the plate cam 275 gradually as it moves in the circumferential direction.

A hollow rotating shaft 279 extends through the stand 273. The rotating shaft 279 is rotatably supported at upper and lower end portions thereof by bearings 281 and 282 fitted to the stand 273. A rotary table 283 is secured to an upper end portion of the rotating shaft 279 so as to be rotatable together with the rotating shaft 279 as one unit. A spur wheel 285 is secured to a lower end portion of the rotating shaft 279 so as to be rotatable together with the rotating shaft 279 as one unit. The spur wheel 285 is driven by a drive source (not shown) to rotate continuously at constant speed. In addition, a distribution and piping box 287 is secured to the rotating shaft 279 below the wheel 285, and a rotary joint 289 for distribution and piping is secured to the rotating shaft 279 below the distribution and piping box 287. Another distribution and piping box 291 is secured to the upper side of the central portion of the table 283. Wiring and piping extend through the rotating shaft 279 between the upper and lower boxes 291 and 287.

A plurality of spout holding members 293 are secured to the outer peripheral portion of the upper side of the table 283 at predetermined spaces in the circumferential direction through respective mounting brackets 295. In addition, a hot plate unit 297 is installed on the table 283 in correspondence to each holding member 293. The hot plate unit 297 has a pair of hot plates 299 and 300 which may have the same configuration. The inner hot plate 299 is secured to the bracket 295 through a mounting block 301 and a thermal insulating board 303 so as to lie underneath the corresponding spout holding member 293. Reference numeral 302 denotes a heater.

An oscillating arm 305 is rotatably supported at an approximately middle position thereof by a shaft 306 secured to a support frame 298 installed on the top of the table 283. The outer hot plate 300 is secured to one end of the arm 305, that is, the lower end thereof as viewed in FIGS. 15 and 16, through a mounting block 307 and a thermal insulating board 309. Reference numeral 308 denote a heater. An air cylinder 311 is installed on one end of a driving arm 315 swingably supported by a shaft 316 secured to the frame 298. The distal end of a rod 313 of the air cylinder 311 is connected to the other end of the oscillating arm 305, that is, the upper end thereof in the figures, through a connecting pin 314.

The lower end of the driving arm 315 is attached to a drive block 319 through a connecting pin 320 so as to be rotatable relative to the drive block 319. The drive block 319 has a cam follower 317 fitted in and guided by the above-described cam groove 277. A link 321 is swingably supported at one end thereof by a shaft 322 secured to the frame 298. The other end of the link 321 is attached to the drive block 319 through a connecting pin 323. The link 321 constitutes a parallel linkage in combination with the driving arm 315. In the hot plate unit 297 arranged as stated above, as the rotary table 283 rotates, the drive block 319 moves in the radial direction of the table 283, that is, in the horizontal direction as viewed in FIG. 16, or stays at the same position. Consequently, the driving arm 315 and the link 321 oscillate and thus cause the oscillating arm 305 to oscillate about the shaft 306 through the air cylinder 311, thereby causing the outer hot plate 300 to move between a position where it abuts against the inner hot plate 299 as shown by the continuous lines in FIG. 16 and a position where the outer hot plate 300 is separate from the inner hot plate 299 as shown by the dashed lines. Alternatively, the outer hot plate 300 is kept staying at either of the positions for a predetermined period of time. When moving the outer hot plate 300, the air cylinder 311 acts as a link. When the outer hot plate 300 is in the position shown by the continuous lines, the air cylinder 311 presses the outer hot plate 300 against the inner hot plate 299.

A bag 501 having a spout 503 tacked thereto on the rotor 209, as has been stated with reference to FIG. 14, is delivered to the primary sealing rotor 227 through the first intermediate rotor 225, and a flange formed on the upper end portion of the spout 503 is held by the spout holding member 293 as shown in FIG. 16. At the time of receiving the bag 501, the outer hot plate 300 is in the position shown by the dashed lines in the figure. As the table 283 rotates, the outer hot plate 300 moves to the position shown by the continuous lines to weld together the spout 503 and the bag body 521 and to seal the bag mouth. In this state, the bag 501, together with the hot plate unit 297, rotates through a predetermined angle. As the hot plate unit 297 approaches a position at which the bag 501 is to be delivered to the second intermediate rotor 229, the oscillating arm 305 moves clockwise, causing the outer hot plate 300 to come away from the inner hot plate 299. Because the hot plate 300 is arranged to pivot about a support provided above the spout holding members 293, when the bag 501 is delivered to another rotor, neither the hot plate 300 nor the oscillating arm 305 will interfere with a spout holding member provided on the other rotor.

Figure 19:
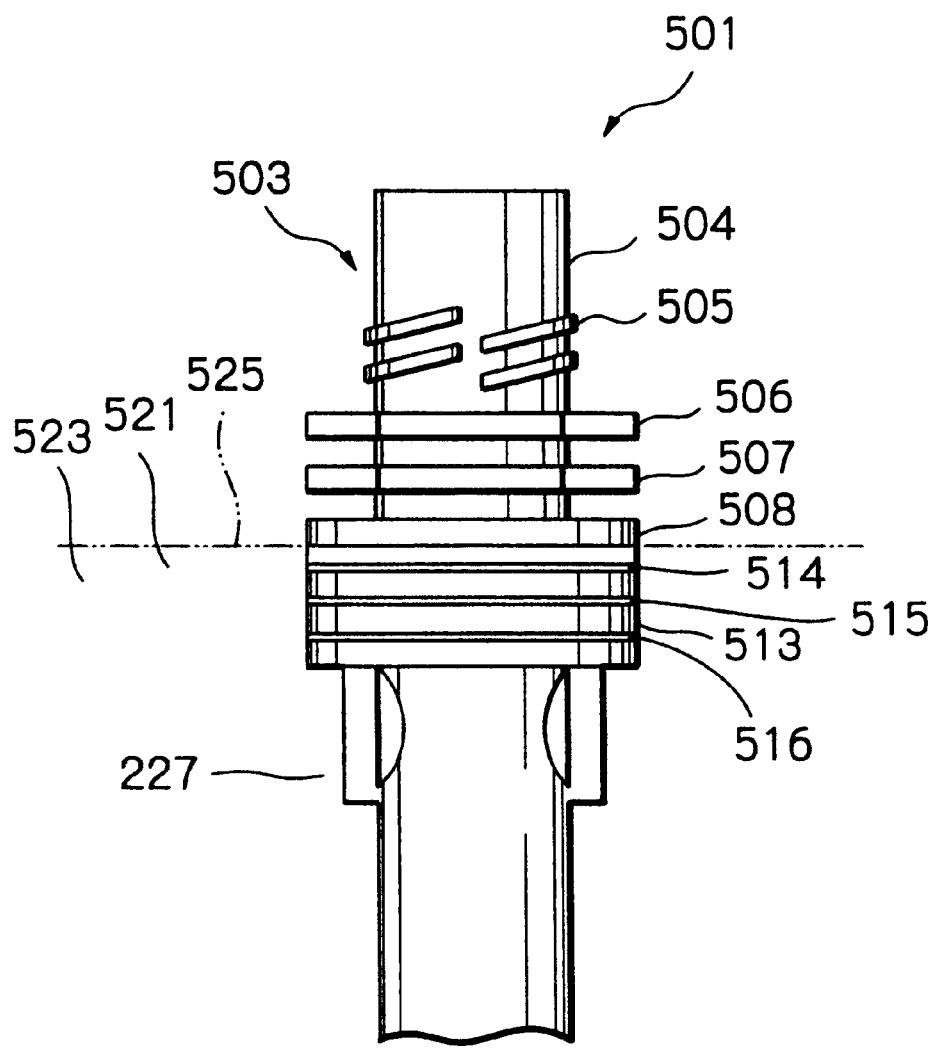
FIG. 19 is a detailed front view of a spout used in the fourth embodiment.

The hot plates 299 and 300 will be described with reference to FIGS. 18A, 18B and 18C. Because the inner hot plate 299 and the outer hot plate 300 have the same configuration as has been stated above, the following description will be made of only the inner hot plate 299. FIGS. 18A and 18B are plan and front views, respectively, of the hot plate 299. FIG. 18C is a left-hand side view of the hot plate 299. As shown in FIG. 19, an upper end portion of the spout 503, that is, a portion 504 located outside the bag mouth portion 523 of the bag body 521, is formed with a thread 505 to be engaged with a cap and three flanges 506, 507 and 508 below the thread 505. A lower end portion 511 of the spout 503 is formed with a welding portion 513 that is to be welded to the bag body 521. The welding portion 513 is provided immediately below the lower flange 508. The configurations of the flanges 506, 507 and 508 and the welding portion 513 may be the same as those shown in FIG. 2 or FIGS. 7 and 8. Therefore, a description thereof is omitted. In FIG. 19, a part of the bag body 521 is shown by the dashed line. As illustrated in the figure, the spout 503 is inserted into the bag body 521 from the bag mouth portion 523 up to the welding portion 513 until the upper end edge 525 of the bag mouth portion 523 of the bag body 521 abuts on the lower surface of the lower flange 508 of the spout 503. Thus, the spout 503 is positioned relative to the bag body 521. In this state, the spout 503 and the bag body 521 are welded together. For the purpose of facilitating understanding, the bag body 521 of the bag 501 and the welding portion 513 of the spout 503 are shown by the chain double-dashed lines in the plan view of FIG. 18A, and only the bag body 521 is shown by the chain double-dashed lines in the front view of FIG. 18B. In the side view of FIG. 18C, only the spout 503 is shown by the chain double-dashed lines.

The hot plate 299 for primary sealing is approximately in the shape of a rectangular parallelepiped and bilaterally symmetric as viewed in the plan and front views. A front side surface 351 of the hot plate 299 is pressed against the bag 501 to effect welding and sealing. The front side surface 351 has a welding portion accommodating recess 353 formed at the center in the lateral direction to extend vertically. The welding portion accommodating recess 353 has a shape corresponding to the welding portion 513 of the spout 503. The front side surface 351 is further formed with front relief recesses 355 and 357 recessed shallowly by a predetermined width from the edge of the front side surface 351 that intersects the left and right side surfaces 359 and 361. As will be clear from the figure, the arrangement is such that a portion of the bag body 521 that has a predetermined width from each side edge thereof does not contact the front side surface 351 of the hot plate 299.

The welding portion accommodating recess 353 has three vertically spaced thin grooves 363, 365 and 367 horizontally extending over a predetermined range. The grooves 363, 365 and 367 are provided to correspond to elongate projections 514, 515 and 516 formed on the welding portion 513 of the spout 503. The projections 514, 515 and 516 are formed thin and small in volume so as to readily melt with heat. During primary sealing, the grooves 363, 365 and 367 allow the air to escape and are fitted with the projections 514, 515 and 516, respectively. Thus, the top portions of the projections 514, 515 and 516 are slightly welded to the bag body 521.

Figure 22A:
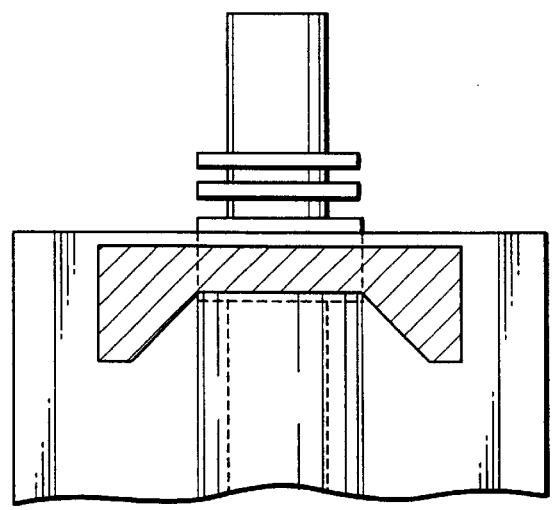
FIGS. 22A, 22B and 22C are front views showing the condition of a sealed portion after the primary sealing, after the secondary sealing and after the cooling, respectively.

The upper surface 369 of the hot plate 299 is formed with a shallow top relief recess 371 extending over the entire lateral length with a predetermined width from the end edge of the upper surface 369 that intersects the front side surface 351 toward the rear side surface 373. The depth of the top relief recess 371 is set at 1.5 millimeters in this embodiment. In welding and sealing, because the bag body 521 is positioned so that the upper end edge 525 of the bag body 521 is flush with the upper surface 369 of the hot plate 299, a portion of the bag body 521 corresponding to the depth of the recess 371 from the upper end edge 525 is not welded. The lower surface 375 of the hot plate 299 is formed with a bottom relief recess 377 extending through the lateral center from the front side surface 351 to the rear side surface 373. The bottom relief recess 377 has a bilaterally symmetric trapezoidal sectional configuration. The distance from the bottom 378 of the bottom relief recess 377 to the upper surface 369 is slightly shorter than the height of the welding portion 513 of the spout 503. Accordingly, the welding portion 513 is not welded at upper and lower end portions thereof having a slight width in the heightwise direction. That is, only a portion of the bag body 521 that is hatched in FIG. 22A is welded by the primary sealing. The reason why the bag body 521 is not welded over the entire width is that both side edge portions of the bag body 521 have already been sealed by welding before the bag 501 is fed to this system. If the already-sealed portions are further subjected to primary sealing and secondary sealing, the amount of the material of the bag body 521 melting at the sealed portions will become excessively large. To avoid excessive melting of the material, the already-sealed portions of the bag body 521 are not subjected to the primary sealing.

Next, the secondary sealing executed on the secondary sealing rotor 231 will be described. Various devices provided on the secondary sealing rotor 231 are the same as those used on the primary sealing rotor 227 except hot plates used for sealing. Therefore, a description of the same devices is omitted.

Figure 20A:
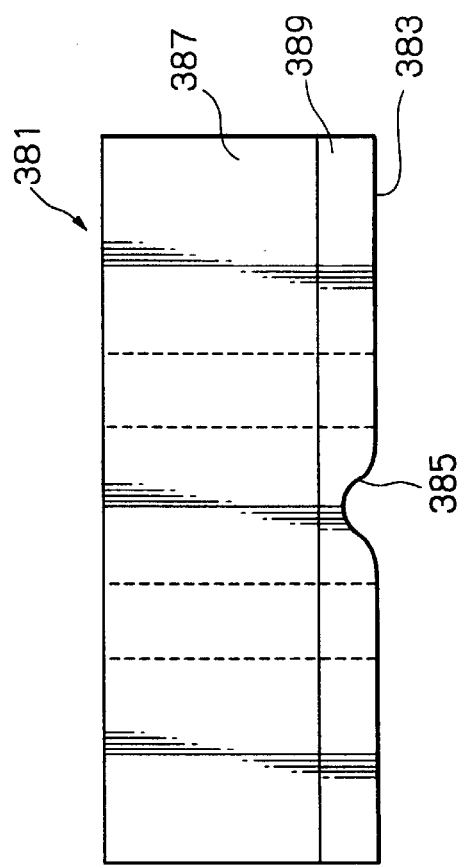
Figure 20B:
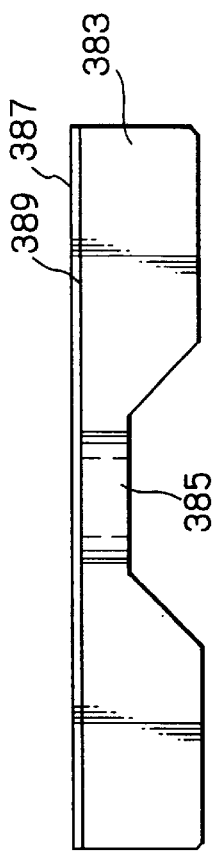
Figure 20C:
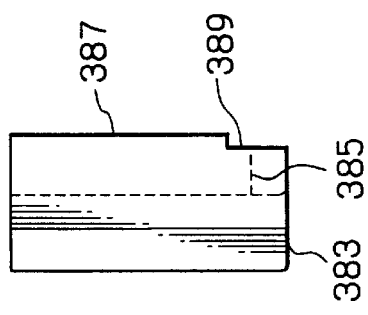
Figure 22B:
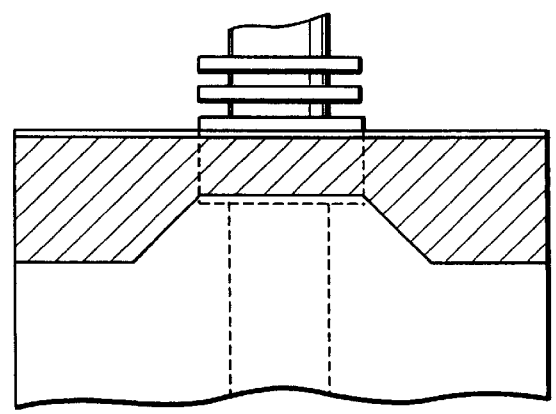

The secondary sealing rotor 231 also uses a pair of hot plates 381 of the same configuration. As shown in FIGS. 20A, 20B and 20C, the configuration of the hot plates 381 is the same as that of the hot plate 299 for primary sealing except the following. That is, the front side surface 383 of each hot plate 381 has a welding portion accommodating recess 385 having the same shape as that of the hot plate 299 for primary sealing. However, the front side surface 383 is not provided with recesses corresponding to the front relief recesses 355 and 357. The welding portion accommodating recess 385 is not provided with grooves corresponding to the grooves 363, 365 and 367 of the hot plate 299 for primary sealing. The upper surface 387 of the hot plate 381 is formed with a recess 389 corresponding to the top relief recess 371 of the hot plate 299 for primary sealing. However, the recess 389 is shallower than the recess 371 of the hot plate 299 for primary sealing. In this embodiment, the depth of the recess 389 is 1 millimeter. Accordingly, when secondary sealing is carried out by using the hot plates 381 for secondary sealing, a portion of the bag body 521 that is hatched in FIG. 22B is welded.

Next, cooling of the sealed portion executed on the sealed portion cooling rotor 235 will be described. Various devices provided on the sealed portion cooling rotor 235 are also the same as those used on the primary sealing rotor 227 except cooling plates used for cooling the sealed portion. Therefore, a description of the same devices is omitted.

Figure 21A:
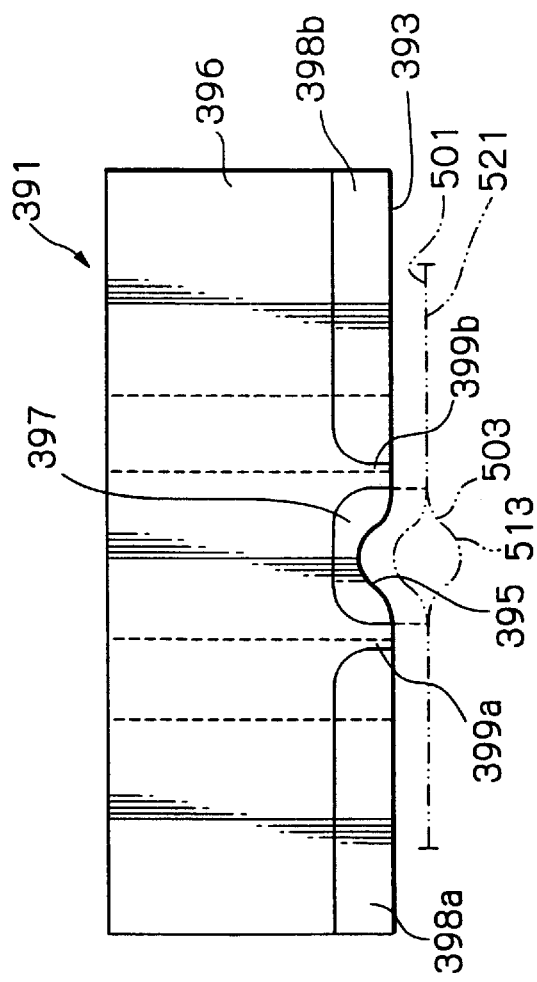
Figure 21B:
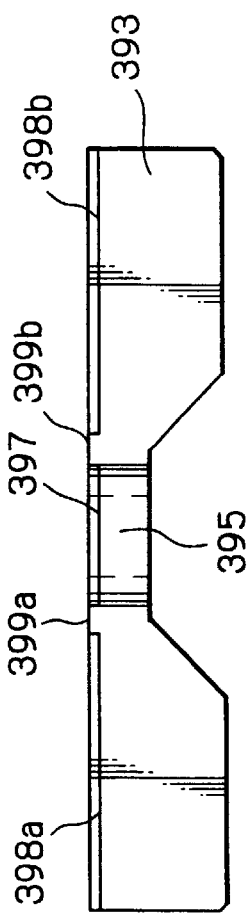
Figure 21C:
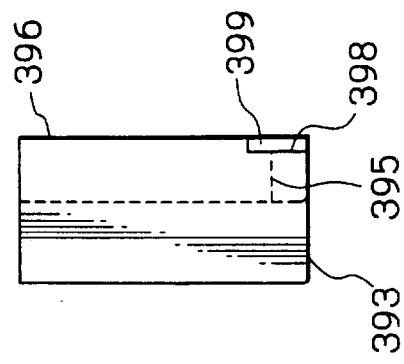
Figure 22C:
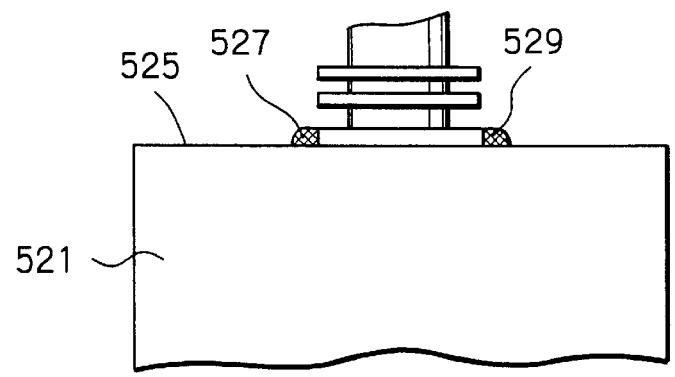

The sealed portion cooling rotor 235 also uses a pair of cooling plates 391 of the same configuration. As shown in FIGS. 21A, 21B and 21C, the configuration of the cooling plates 391 is the same as that of the hot plates 381 for secondary sealing except the following. That is, the front side surface 393 of each cooling plate 391 is formed with a welding portion accommodating recess 395 of the same shape as that of the recess 385 of the hot plate 381 for secondary sealing. Thus, the front side surface 393 has the same configuration as that of the front side surface 383 of the hot plate 381 for secondary sealing. However, the cooling plate 391 is different from the hot plate 381 in the shape in a plan view of a top relief recess formed on the upper surface 396. That is, as shown in FIG. 21A, the top relief recess is formed from three separate recesses, i.e. a central recess 397 formed around the welding portion accommodating recess 395, and left and right recesses 398a and 398b each formed at a predetermined distance from the central recess 397. Portions 399a and 399b between the central recess 397 and the left and right recesses 398a and 398b are located at both the left and right ends of the welding portion 513 as viewed in a plan view to serve as melted material squeezing portions. In other words, when the cooling plates 391 are pressed against each other with the bag 501 held between, the materials of the bag 501 and the spout 503 melted during the second sealing process are squeezed out from the upper end edge 525 of the bag body 521 by the squeezing portions to form efflux layers 527 and 529 as shown in FIG. 22C. As has been stated in regard to the first embodiment, the efflux layers 527 and 529 are used as an index of the sealing condition of the seal between the bag body 521 and the welding portion 513 of the spout 503 and the sealing condition of the remaining portion of the bag mouth portion 523 of the bag body 521 to perform an inspection for judging the sealing quality at the subsequent step. It should be noted that the above-described hot plates 381 for secondary sealing may be formed with the same shape as that of the cooling plates 391 so as to have melted material squeezing portions, thereby forming efflux layers 527 and 529 when secondary sealing is performed. In this case, however, the melted material squeezed out may scorch by adhering to the hot plates 381, causing contamination.

Figure 23:
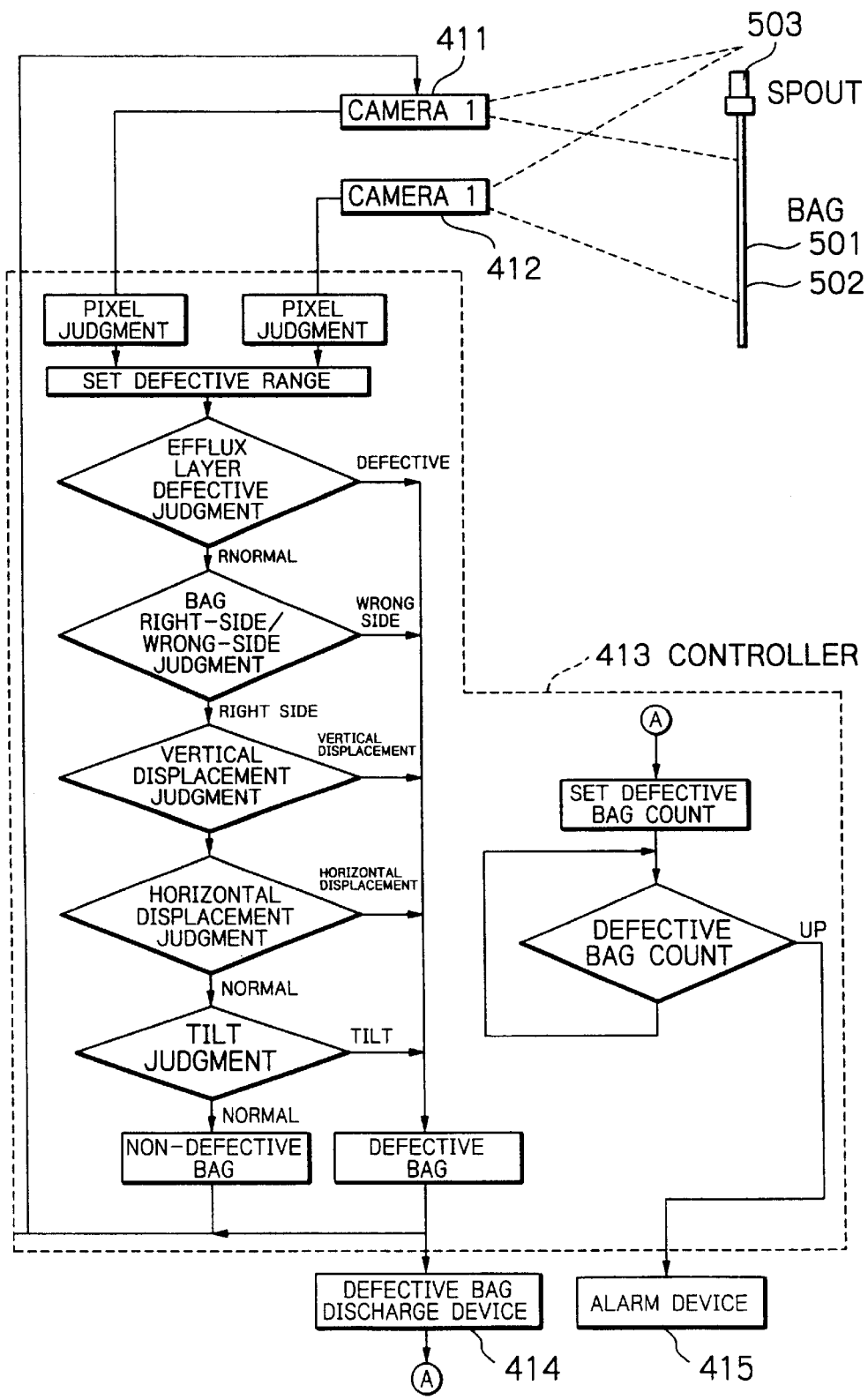
FIG. 23 is a system diagram of the inspection apparatus in the fourth embodiment.

Next, a description will be made of the inspection of the sealed portion and other inspection performed on the fourth intermediate rotor 237 by using the inspection apparatus 239. Unlike the inspection apparatus in the first embodiment, the inspection apparatus 239 in this embodiment uses two cameras 411 and 412 as shown in the system diagram of FIG. 23. An LED illuminating device (not shown) is used for illumination. The system includes a controller 413, a defective bag discharge device 414, and an alarm device 415. The cameras 411 and 412 take predetermined images, respectively. The controller 413 captures the images taken with the cameras 411 and 412, performs pixel judgment, compares the result of the pixel judgment with a preset defective range, and makes a quality judgment concerning various items of inspection. The defective bag discharge device 414 discharges a bag judged to be defective from the line. The alarm device 415 gives an alarm when a predetermined condition is satisfied.

Figure 24A:
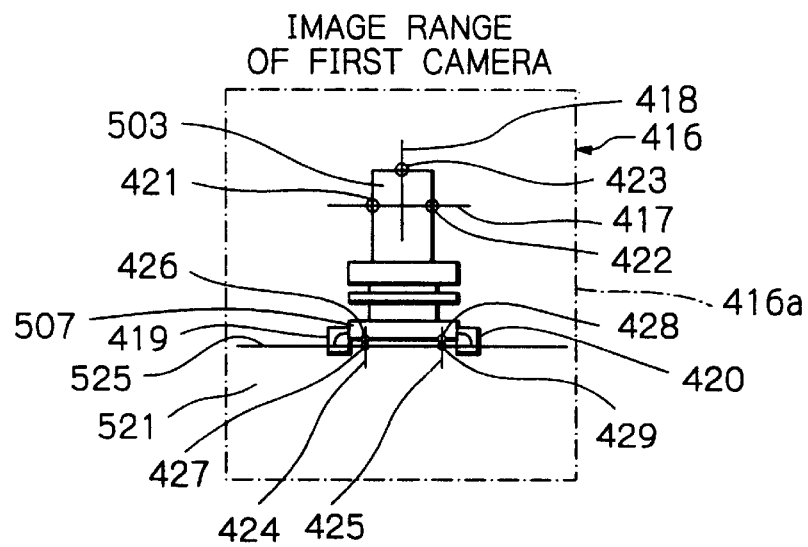
FIGS. 24A and 24B are views showing the ways in which subject images are taken with a first camera and a second camera, respectively.
Figure 24B:
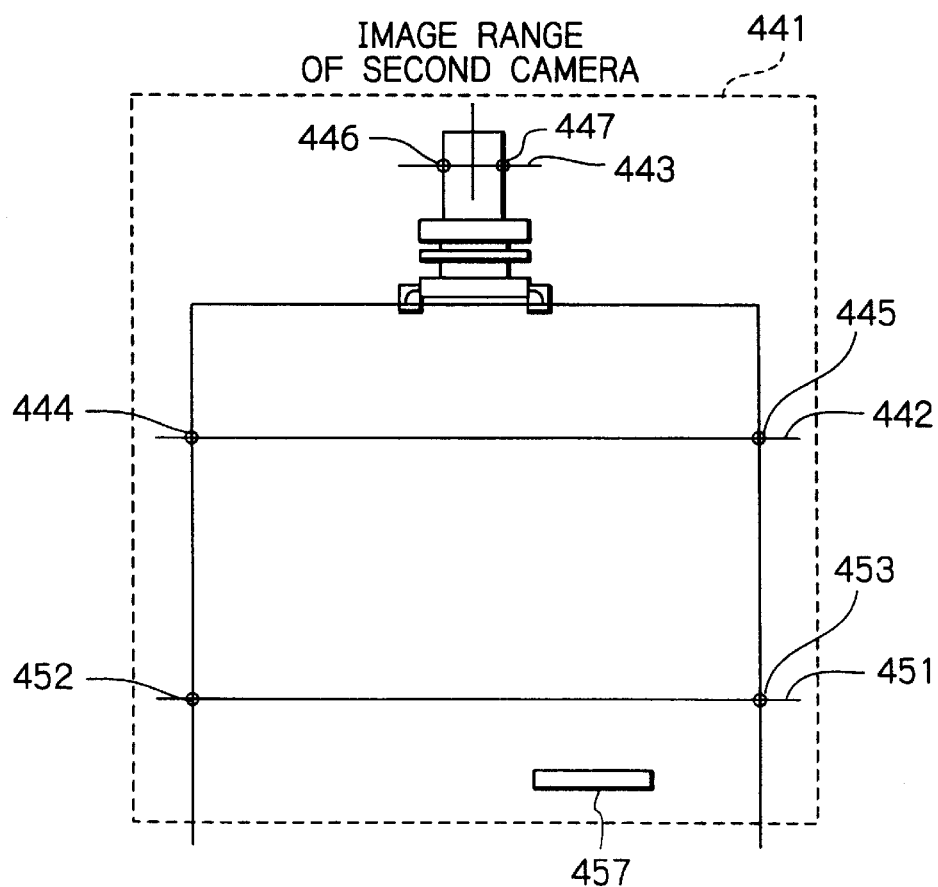

FIGS. 24A and 24B are diagrams showing the ranges of images taken with the first camera 411 and the second camera 412, respectively, i.e. the fields of view, inspection gates, measuring lines, etc. The first camera 411 takes an image of the spout 503 and the upper part of the bag body 521 to perform an inspection of the sealed portion and to inspect the spouted bag for a vertical displacement between the spout 503 and the bag body 521.

First, the inspection of the sealed portion will be described. The sealed portion inspection in this embodiment is also performed by subjecting an image portion containing the efflux layers 527 and 529 to image processing as in the case of the inspection in the first embodiment. The processing method is the same as in the first embodiment. In this embodiment, however, the position of the spout 503 in the image range of the first camera 411 is measured before the image processing is started. When the spout 503 is at a position displaced relative to a reference position, the positions of inspection gates and so forth are corrected in accordance with the amount of displacement of the spout 503. That is, the cameras 411 and 412 are fixed at predetermined positions, respectively, and hence the positions of their fields of view are fixed. However, the positions of a plurality of spout holding members installed on the rotor 237 may be somewhat displaced. When there is a displacement of the position of a spout holding member, accurate inspection cannot be performed if the positions of inspection gates are fixedly set within the image range of the camera. Therefore, the positions of the inspection gates and so forth are moved in accordance with the change in position of the spout 503 within the field of view.

Within the image range 416 of the first camera 411, a horizontal follow-up line 417 and a vertical follow-up line 418 are set. The horizontal follow-up line 417 is set with a predetermined length in the horizontal direction by using the right edge 416a, for example, of the image range 416 as the reference. The vertical follow-up line 418 is set with a predetermined length in the vertical direction by using the upper edge 416b, for example, of the image range 416 as the reference.

When the first camera 411 has actually taken an image of a bag 501 moved to a position in front of the first camera 411, the positions of points 421 and 422 at which the horizontal follow-up line 417 intersects the left and right edges of the spout 503 are detected. The center position of the spout 503 in the horizontal direction can be calculated from the distances from the right edge 416a of the image range 416 to the points 421 and 422. The inner edges of efflux layer inspection gates 419 and 420 are set at bilaterally symmetric positions with respect to the calculated center position at a predetermined distance from the center position. The outer edges of the efflux layer inspection gates 419 and 420 are set in the same way. Meanwhile, the position of a point 423 at which the vertical follow-up line 418 intersects the upper end edge of the spout 503 is detected. The upper and lower edges of the efflux layer inspection gates 419 and 420 are set at predetermined distances, respectively, from the position of the point 423. Thus, the positions of the efflux layer inspection gates 419 and 420 are variably set in accordance with a change in position of the spout 503. The images of the efflux layers 527 and 528 taken within the efflux layer inspection gates 419 and 420 are subjected to image processing in the same way as in the first embodiment to judge the sealing quality of the sealed portion.

Next, a method of measuring a vertical displacement between the spout 503 and the bag body 521 will be described. For this measurement, spout vertical displacement measuring lines 424 and 425 are set within the image range 416. The lines 424 and 425 are set with a predetermined vertical length at bilaterally symmetric positions with respect to the calculated center position of the spout 503 in the horizontal direction at a predetermined distance below the detected intersection 423 on the vertical follow-up line 418. Then, points 426 and 428 of intersection between the measuring lines 424 and 425 and the lower surface of the lower flange 508 of the spout 503 are detected. In addition, points 427 and 429 of intersection between the measuring lines 424 and 425 and the upper end edge 525 of the bag body 521 are detected. Then, the distance between the intersections 426 and 427 and between the intersections 428 and 429 is calculated by image processing. If the calculated distance is greater than a predetermined value, the bag under inspection is judged to be defective.

Next, inspecting operations performed with the second camera 412 will be described. The image range 441 of the second camera 412 is wider than the image range 416 of the first camera 411 and sufficiently wide to contain the spout 503 and at least the upper portion of the bag body 521 over the entire width thereof.

First, the inspection for a horizontal displacement of the spout 503 with respect to the bag body 521 will be described. For this inspection, a measurement reference line 442 is set at a position a predetermined distance below the upper end edge of the bag body 521. The line 442 extends horizontally beyond the left and right edges of the bag body 521. Next, a horizontal displacement measuring line 443 is set at a position on the upper portion 504 of the spout 503 where the thread 505 is not provided. The line 443 crosses the spout 503 horizontally. Points 444 and 445 of intersection between the reference line 442 and the left and right edges of the bag body 521 are detected. Further, points 446 and 447 of intersection between the horizontal displacement measuring line 443 and the left and right edges of the spout 503 are detected. A center position in the horizontal direction between the intersections 444 and 445 and a center position in the horizontal direction between the intersections 446 and 447 are calculated from the detected positions of these points of intersection. Thus, a displacement between the center positions, that is, a displacement in the horizontal direction between the spout 503 and the bag body 521, is calculated. If the calculated displacement is greater than a predetermined value, the bag under inspection is judged to be defective.

Next, the inspection for a tilt of the spout 503 with respect to the bag body 521 will be described. In this case, a spout tilt measuring line 451 is set at a position a predetermined distance below the above-described measurement reference line 442. The line 451 extends horizontally as in the case of the measurement reference line 442. Points 452 and 453 of intersection between the spout tilt measuring line 451 and both side edges of the bag body 521 are detected. The position of a center point in the horizontal direction between the points 452 and 453 is calculated. Displacement between the calculated center position and the center position on the measurement reference line 442 calculated above indicates a tilt of the spout 503 with respect to the bag body 521. If the displacement is greater than a predetermined value, the bag under inspection is judged to be defective.

The following is a description of the inspection for judging whether the imaged side of the bag 501 under inspection is the right side or the wrong side. That is, when a material to be packed is filled into the bag 501 on the filling rotor 247 in the filling apparatus 205, the bag 501 is printed with data, e.g. the date of manufacture. Because the side of the bag 501 to be printed is predetermined, it is necessary to deliver the bags 501 from the spout fitting apparatus 203 to the filling apparatus 205 in a uniform right-side/wrong-side orientation. Accordingly, the inspection for the right-side/wrong-side judgment is required. The right and wrong sides of the bag body 521 differ from each other in print made thereon, for example. In a case where the right side of the bag body 521 is printed with a bar code, for example, a right-side/wrong-side inspection gate 457 is set at a position corresponding to the position where the bar code is printed, and the image within the gate 457 is processed to judge whether the imaged side of the bag 501 is the right side or the wrong side. If the bag 501 is held in the wrong orientation, it is judged to be defective. It should be noted that the detection of a defect in the spout 503 itself, e.g. a chip in the mouth at the distal end of the spout 503, is simultaneously performed by image processing in addition to the above-described inspection, although a detailed description thereof is omitted because it can be readily understood from the foregoing description.

Figure 25:
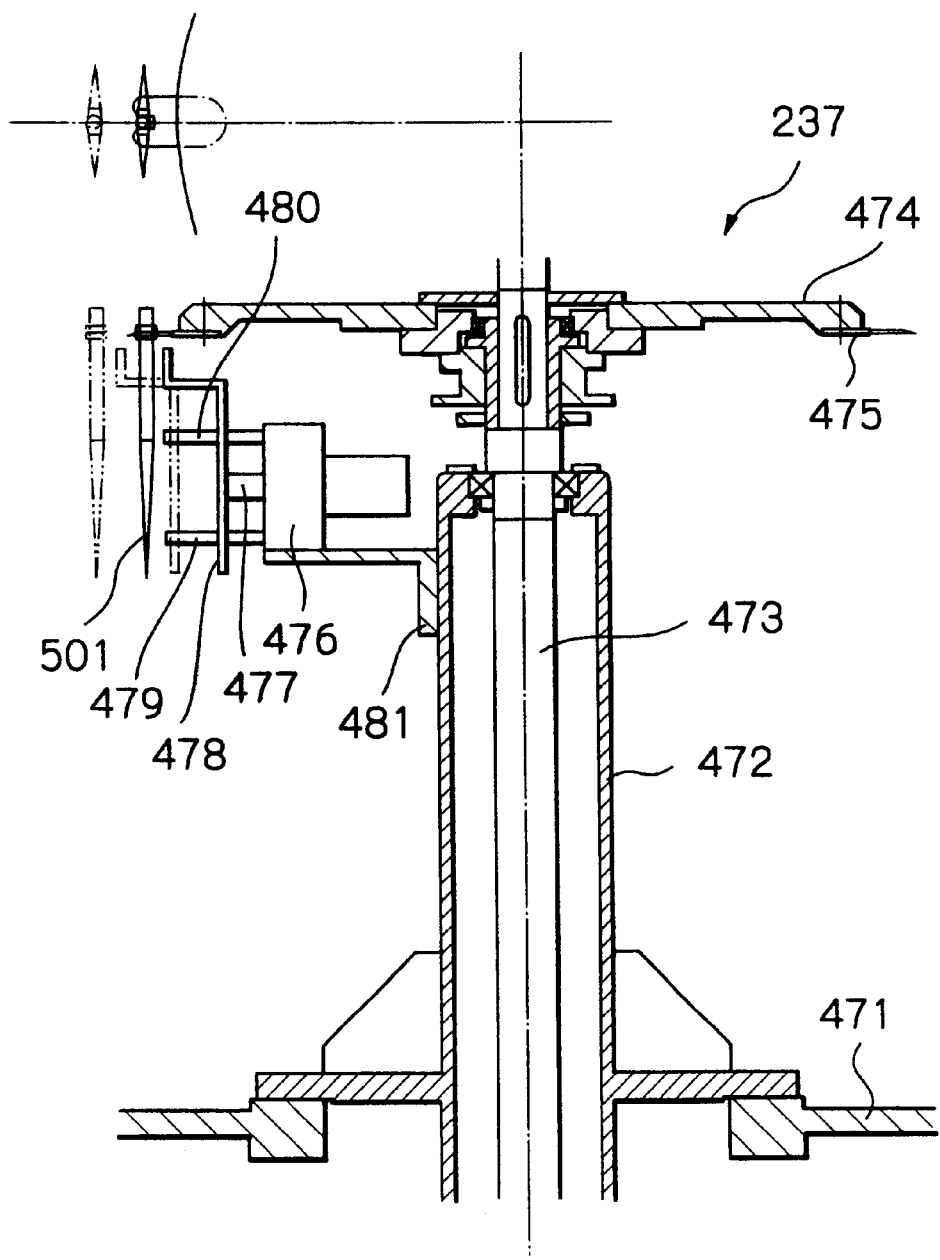
FIG. 25 is a sectional side view of a defective bag discharge device.

It should be noted that the fourth intermediate rotor 237 for performing the above-described inspection is provided with a defective bag discharge device 414 for discharging a bag judged to be defective. More specifically, as shown in FIG. 25, a hollow stand 472 is stood on a base 471 of the rotor 237. A rotary plate 474 is secured to the distal end of a rotating shaft 473 extending through the stand 472 and rotatably supported. A plurality of spout holding members 475 are installed on the outer peripheral portion of the rotary plate 474. The spout holding members 475 have the same configuration as that of the spout holding members 293 described above in connection with the primary sealing rotor 227. Each spout holding member 475 has an outwardly bifurcated end on the side thereof opposite to the side at which it is secured to the rotary plate 474. An air cylinder 476 is attached to a predetermined position on the outer periphery of the stand 472 through a bracket 481. A discharge plate 478 shaped as shown in the figure is secured to the distal end of a rod 477 of the air cylinder 476. When a bag 501 judged to be defective in regard to any of the inspection items at the above-described inspection steps is moved to a position in front of the discharge plate 478, the air cylinder 476 operates, thus causing the discharge plate 478 to push the bag 501 so that the bag 501 disengages from the spout holding member 475. Reference numerals 479 and 480 denote guide rods for the discharge plate 478.

As will be clear from the foregoing description, it is possible according to the present invention to readily form an efflux layer of the melted material, which is usable as an inspective object at a subsequent inspection step, at the same time as an opening portion of a packaging container is sealed. The efflux layer can be used as an index of the sealing condition of the whole sealed portion. Thus, according to the present invention, because a specific part serving as an inspective object can be formed, it becomes possible to automate the inspection of the sealed portion, which has heretofore been performed by visual observation. Accordingly, the operating efficiency improves. Moreover, if the inspection step is added to a conventional automatic filling and packaging system, the inspection can be continuously performed as a part of a series of filling and packaging operations. A product judged to be defective in the sealing condition can pass through the subsequent steps without undergoing filling and other operations. Accordingly, it is possible to eliminate waste, which is extremely advantageous.

The inspection process according to the present invention is performed as follows. An image of an efflux layer formed outside the sealed portion by the melted material flowing out of the sealed portion when the packaging container is sealed is taken with an imaging device. The image of the efflux layer within a preset inspection region or a part of the image is subjected to image processing to obtain data concerning the efflux layer. Then, the obtained data is compared with a preset criterion for judgment. Thus, the inspection can be performed extremely easily and speedily, and the inspection accuracy is very high. Moreover, if the relationship between the sealing condition at a specific spot of the sealed portion and the sealing condition at the remaining part of the sealed portion is checked in advance and a criterion for judgment is set on the basis of the relationship, the sealed portion can be inspected by using a part of the sealed portion as a representative of the whole sealed portion, and the time required for the inspection can be minimized.

Further, if the inspection region is controlled in accordance with the position of the imaging subject within the field of view of the imaging device, the inspection can be performed even more accurately.

It should be noted that the present invention is not limited to the foregoing embodiments but can be modified in a variety of ways.

What is claimed is:

1. An apparatus for sealing and inspecting a seal portion of a packaging bag formed by using a base material formed from a stack of a plurality of layers in which at least an innermost layer is a welding layer made of a thermoweldable material, said seal portion being defined along an edge of an opening portion of said packaging bag, said apparatus comprising:

a sealing apparatus for sealing said seal portion and an inspecting apparatus for inspecting said seal portion;
said sealing apparatus for sealing said seal portion comprising:
melting means for melting said welding layer at said seal portion; and
allowing means for allowing a part of a melt from said welding layer to flow out from the edge of said opening portion at a predetermined position along said edge, whereby said sealing apparatus seals said seal portion and also forms an efflux layer outside said opening portion by said melt flowing out and solidified, and
said inspecting apparatus comprising:
an imaging device having a field of view capable of taking an image of an imaging subject including at least a part of said seal portion and its vicinities including at least a part of said efflux; and
a controller;
said controller including:
a defective range setting unit for setting inspection conditions and a criterion for judgment of sealing quality of said seal portion;
a sealing quality judging unit; and
a central control unit;
wherein said central control unit controls said apparatus, captures the image taken with said imaging device, defines an inspection region including at least a part of said image in accordance with said inspection conditions, divides said inspection region into a plurality of pixels of a predetermined size, and judges whether or not each pixel located outside said seal portion is filled with an efflux layer formed by a melt of said material flowing out of said seal portion, and said sealing quality judging unit compares a result of judgment made by said central control unit with said criterion for judgment to judge sealing quality of said seal portion.

2. An apparatus according to claim 1, wherein said defective range setting unit sets a reference value concerning the number of pixels filled with said efflux layer as a criterion for judgment of sealing quality, and said central control unit calculates the number of pixels filled with said efflux layer among pixels located outside said seal portion.

3. An apparatus according to claim 2, wherein said defective range setting unit further sets a reference value for a maximum height of said efflux layer from an end edge of said seal portion as a criterion for judgment of sealing quality, and said central control unit measures the maximum height of said efflux layer from the end edge of said seal portion.

4. An apparatus according to claim 3, wherein said controller further includes an inspection position control unit for detecting a position of an inspection reference part defined by a predetermined part of said imaging subject within said field of view of said imaging device and for controlling the position of said inspection region according to the position of said inspection reference part.

5. An apparatus according to claim 1, wherein said controller further includes an inspection position control unit for detecting a position of an inspection reference part defined by a predetermined part of said imaging subject within said field of view of said imaging device and for controlling the position of said inspection region according to the position of said inspection reference part.

6. An apparatus according to claim 1, wherein said melting means includes a pair of heating plates for melting said welding layer by pressing said seal portion between said heating plates under application of heat; and wherein said allowing means includes a pair of cooling plates for cooling said seal portion by pressing it between said cooling plates.

7. A method of sealing and inspecting a seal portion of a packaging bag formed by using a base material formed from a stack of a plurality of layers in which at least an innermost layer is a welding layer made of a thermoweldable material, said seal portion being defined along an edge of an opening portion of said packaging bag, said method comprising the steps of:

melting said welding layer at said seal portion;

allowing a part of a melt from said welding layer to flow out from the edge of said opening portion at a predetermined position along said edge, thereby sealing said seal portion and also forming an efflux layer outside said opening portion by said melt flowing out and solidified;

taking an image of an imaging subject including at least a part of said seal portion and its vicinities including at least a part of said efflux layer;

defining at least a part of said image as an inspection region;

subjecting an image of said inspection region to predetermined image processing to calculate data concerning an efflux layer formed outside said seal portion by a melt of said material flowing out of said seal portion; and comparing said data with a present condition for judgment to judge sealing quality of said seal portion.

8. A method according to claim 7, wherein said data is obtained by dividing the image of said inspection region into pixels of a predetermined size and judging whether or not each of the pixels is filled with said efflux layer.

9. A method according to claim 8, further comprising the steps of:

setting reference information concerning an inspection reference part defined by a predetermined part of said imaging subject within a field of view of an imaging device for taking an image of said imaging subject;

storing said reference information:

detecting said inspection reference part from the image taken with said imaging device;

performing a comparison operation to compare information concerning said detected inspection reference part with said reference information; and controlling the position of said inspection region according to a result of said comparison operation.

10. A method according to claim 7, wherein said step of melting said welding layer includes a heating step of melting said seal portion by pressing it between a pair of heating plates under application of heat; and wherein said step of allowing a part of a melt from said welding layer to flow out includes a cooling step of cooling said seal portion by pressing it between a pair of cooling plates.

11. A method according to claim 10, wherein said seal portion is welded at a welding portion separated from the edge of said opening portion by a non-welding portion with a predetermined width extending along said edge, and wherein said heating step includes a first heating step and a second heating step, and wherein at said second heating step, said seal portion is melted under application of heat in such a manner as to leave a non-welding portion narrower in width than a non-welding portion left at said first heating step.

* * * * *